United States Patent
Kato et al.

(10) Patent No.: US 8,751,081 B2
(45) Date of Patent: Jun. 10, 2014

(54) HYBRID VEHICLE AND CONTROL METHOD THEREOF

(75) Inventors: Norihiko Kato, Handa (JP); Masaya Yamamoto, Kasugai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 276 days.

(21) Appl. No.: 13/321,090

(22) PCT Filed: May 19, 2009

(86) PCT No.: PCT/JP2009/059203
§ 371 (c)(1),
(2), (4) Date: Nov. 17, 2011

(87) PCT Pub. No.: WO2010/134163
PCT Pub. Date: Nov. 25, 2010

(65) Prior Publication Data
US 2012/0072063 A1    Mar. 22, 2012

(51) Int. Cl.
*B60W 20/00* (2006.01)
*B60W 10/08* (2006.01)

(52) U.S. Cl.
USPC ........... 701/22; 701/36; 903/903; 180/65.275

(58) Field of Classification Search
USPC ................ 701/1, 22, 36; 180/65.265, 65.275, 180/65.28, 65.285, 65.29; 903/903–907
See application file for complete search history.

(56) References Cited

U.S. PATENT DOCUMENTS

| | | | |
|---|---|---|---|
| 2006/0241826 A1* | 10/2006 | Ishishita et al. | 701/22 |
| 2010/0044131 A1* | 2/2010 | Teraya | 180/65.265 |
| 2010/0152938 A1* | 6/2010 | Aoki et al. | 701/22 |
| 2012/0072066 A1* | 3/2012 | Kato et al. | 701/22 |
| 2013/0024063 A1* | 1/2013 | Yamamoto et al. | 701/22 |

FOREIGN PATENT DOCUMENTS

| | | |
|---|---|---|
| JP | 2003-269208 A | 9/2003 |
| JP | 2009-018713 A | 1/2009 |

OTHER PUBLICATIONS

International Search Report mailed Jun. 16, 2009 of PCT/JP2009/059203.

* cited by examiner

*Primary Examiner* — Jason Holloway
(74) *Attorney, Agent, or Firm* — Kenyon & Kenyon LLP

(57) ABSTRACT

A hybrid vehicle that runs in an electric running priority mode after the engine reaches a driving condition appropriate for heating the catalyst (S130-S150) if the system has been started up and the following conditions are met: the vehicle is running in an electric running priority mode in which electric power is used preferentially to drive the vehicle; the temperature (Tc) at which the catalyst becomes activated to purify the engine exhaust falls below a threshold value (Tref); and a battery storage rate (SOC) falls below a threshold value (Scd) which reaches a threshold value (Shv). Then the system switches to a hybrid running priority mode after running on electric power for the length of time necessary to heat the catalyst.

8 Claims, 15 Drawing Sheets

HYBRID VEHICLE AND CONTROL METHOD THEREOF

This is a 371 national phase application of PCT/JP2009/059203 filed 19 May 2009, the contents of which are incorporated herein by reference.

TECHNICAL FIELD

The present invention relates to a hybrid vehicle and a control method thereof. More specifically, the invention pertains to a hybrid vehicle, having an internal combustion engine capable of outputting power for driving the hybrid vehicle and equipped with an exhaust system with a catalytic conversion unit including a purifying catalyst for purifying exhaust, a motor constructed to input and output power for driving the hybrid vehicle, a battery unit including at least one secondary battery designed to transmit electric power to and from the motor, and a charger connected to an external power supply in a system shutdown state of the hybrid vehicle to charge the secondary battery of the battery unit with electric power from the external power supply. The hybrid vehicle being capable of motor travel where the hybrid vehicle is driven only with input and output power to and from the motor and hybrid travel where the hybrid vehicle is driven with output power from the internal combustion engine and with the input and output power to and from the motor, and a control method of such a hybrid vehicle.

BACKGROUND ART

In one proposed hybrid vehicle having an engine that outputs power for vehicle travelling, a motor that outputs power for vehicle travelling, a battery that supplies electric power to the motor, an engine heater for heating the engine, and a catalyst heater for heating a purifying catalyst which purifies the engine exhaust, the engine is operated to charge the battery when an accumulated charge amount SOC in the battery becomes less than or equal to a preset value SOC1. In the proposed hybrid vehicle, the engine heater and the catalyst heater are operated to preheat the engine and the purifying catalyst when the accumulated charge amount SOC in the battery becomes a preset value SOC2 which is smaller than the preset value SOC1 (see, for example, Patent Document 1). Preheating the engine and the purifying catalyst leads to preventing that the exhaust emission is worsened at startup and post-startup of the engine in this proposed hybrid vehicle.

PRIOR ART DOCUMENT

Patent Document

Patent Document 1: Japanese Patent Laid-Open No. 2003-269208

SUMMARY OF THE INVENTION

Some hybrid vehicles have the engine heater and the catalyst heater as described above. In the other hybrid vehicles without these heaters, warm-up of the engine and the purifying catalyst is required. There is thus a proposal to start up the engine for the warm-up at a system startup timing of the vehicle. However, in a type of hybrid vehicles such as a vehicle in which a relatively large capacity battery is installed and the battery is charged with electric power from a commercial power supply during system shutdown of the vehicle, there is a case where the vehicle is driven to a destination only with motor drive. In this case, fuel efficiency is worsened if the engine is started up at system startup of the vehicle.

In a hybrid vehicle and a control method of a hybrid vehicle of the invention, the main object of the invention is to start up an internal combustion engine at a more appropriate timing to warm up a purifying catalyst for purifying exhaust of the internal combustion engine.

In order to attain the main object, the hybrid vehicle and the control method of the hybrid vehicle of the invention have the configurations discussed below.

According to one aspect, the present invention is directed to a hybrid vehicle. The hybrid vehicle, having an internal combustion engine capable of outputting power for driving the hybrid vehicle and equipped in an exhaust system with a catalytic conversion unit including a purifying catalyst for purifying exhaust, a motor constructed to input and output power for driving the hybrid vehicle, a battery unit including at least one secondary battery designed to transmit electric power to and from the motor, and a charger connected to an external power supply in a system shutdown state of the hybrid vehicle to charge the secondary battery of the battery unit with electric power from the external power supply, the hybrid vehicle being capable of motor travel where the hybrid vehicle is driven only with input and output power to and from the motor and hybrid travel where the hybrid vehicle is driven with output power from the internal combustion engine and with the input and output power to and from the motor, the hybrid vehicle having: an accumulated charge ratio calculation module configured to calculate an accumulated charge ratio that is a ratio of an accumulated charge amount in the at least one secondary battery of the battery unit to a whole capacity of the at least one secondary battery of the battery unit; a mode setting module configured to, when the calculated accumulated charge ratio is at least larger than a first preset ratio at system startup of the hybrid vehicle, set a motor travel priority mode where the motor travel is prioritized for driving the hybrid vehicle until the calculated accumulated charge ratio becomes less than a second preset ratio that is less than the first preset ratio during vehicle travelling, while setting a hybrid travel priority mode where the hybrid travel is prioritized for driving the hybrid vehicle when the motor travel priority mode is not set; and a control module configured to, when the calculated accumulated charge ratio becomes less than a third preset ratio that is smaller than the first preset ratio and larger than the second preset ratio in a state that the purifying catalyst is not at a temperature where the purifying catalyst is activated during vehicle travelling upon setting the motor travel priority mode to prioritize the motor travel, control the internal combustion engine and the motor so that the internal combustion engine is started up and the hybrid vehicle is driven with the motor travel priority mode while the internal combustion engine is operated in an appropriate state to warming up the purifying catalyst.

The hybrid vehicle according to this aspect of the invention, at system startup of the hybrid vehicle, when an accumulated charge ratio that is a ratio of an accumulated charge amount in the at least one secondary battery of the battery unit to a whole capacity of the at least one secondary battery of the battery unit is at least larger than a first preset ratio, sets a motor travel priority mode where the motor travel is prioritized for driving the hybrid vehicle until the accumulated charge ratio becomes less than a second preset ratio that is less than the first preset ratio during vehicle travelling, while setting a hybrid travel priority mode where the hybrid travel is prioritized for driving the hybrid vehicle when the motor travel priority mode is not set. When the accumulated charge ratio becomes less than a third preset ratio that is smaller than the first preset ratio and larger than the second preset ratio in a state that the purifying catalyst is not at a temperature where the purifying catalyst is activated during vehicle travelling upon setting the motor travel priority mode to prioritize the motor travel, the hybrid vehicle controls the internal combustion engine and the motor so that the internal combustion engine is started up and the hybrid vehicle is driven with the motor travel priority mode while the internal combustion engine is operated in an appropriate state to warming up the purifying catalyst. Accordingly, upon system shutdown of the vehicle before the accumulated charge ratio becomes less than the third preset ratio, the internal combustion engine is not started up to warm up the purifying catalyst. In comparison with a vehicle where the internal combustion engine is started up to warm up the purifying catalyst at system startup of the vehicle, fuel efficiency is enhanced. As a result, it is enabled that the internal combustion engine is started up at a more appropriate timing to warm up the purifying catalyst for purifying exhaust of the internal combustion engine. As a matter of course, it is prevented to worsen the exhaust emission when the hybrid vehicle is driven with the hybrid travel prioritized, after the accumulated charge ratio reaches the second preset ratio and the hybrid travel priority mode is set. In this arrangement, the 'third preset ratio' may be set so that the calculated accumulated charge ratio becomes the second preset ratio in a case that the hybrid vehicle is driven with the motor travel for a required time to warm up the purifying catalyst. In this arrangement, the 'third preset ratio' may be set so that the calculated accumulated charge ratio becomes the second preset ratio in a case that the hybrid vehicle is driven with a maximum power under the motor travel for a required time to warm up the purifying catalyst. Use of these 'third preset ratio' enables to complete warm-up of the purifying catalyst more certainly before the accumulated charge ratio reaches the second preset ratio and the hybrid travel priority mode is set.

In one preferable application of the hybrid vehicle, the battery unit may have at least one main secondary battery, at least one auxiliary secondary battery, a main connect/disconnector that connects and disconnects the at least one main secondary battery to and from a side of the motor, an auxiliary connect/disconnector that connects and disconnects the at least one auxiliary secondary battery to and from the side of the motor, a main step-up-down circuit that transmits electric power with voltage regulation between a main battery voltage system connected to the at least one main secondary battery and a high voltage system at the side of the motor, and an auxiliary step-up-down circuit that transmits electric power with voltage regulation between an auxiliary battery voltage system connected to the at least one auxiliary secondary battery and the high voltage system at the side of the motor, and the control module may be configured to, when the motor travel priority mode is set, control the main connect/disconnector and the main step-up-down circuit so that the at least one main secondary battery is connected to the side of the motor and power from the at least one main secondary battery is supplied to the motor and control the auxiliary connect/disconnector and the auxiliary step-up-down circuit so that the at least one auxiliary secondary battery is connected to the side of the motor and power from the at least one auxiliary secondary battery is supplied to the motor, while controlling the main connect/disconnector and the main step-up-down circuit so that a connection between the at least one main secondary battery and the side of the motor is maintained and a transmission between electric power of the at least one main secondary battery and electric power of the side of the motor is performed and control the auxiliary connect/disconnector so that all of the at least one auxiliary secondary battery is disconnected from the side of the motor when the calculated accumulated charge ratio becomes less than the second preset ratio during vehicle travelling with the motor travel priority mode and then the hybrid travel priority mode is set. This arrangement enables to lengthen travelling distance by the motor travel in the motor travel priority mode and enables to increase output power at the motor travel under the motor travel priority mode. In this arrangement, the timing when the accumulated charge ratio becomes less than the third preset ratio during vehicle travelling upon setting the motor travel priority mode to prioritize the motor travel is a timing before disconnecting all of the auxiliary secondary battery from the side of the motor. Further in this arrangement, the battery unit may have one secondary battery as the main secondary battery and two or more secondary batteries as the auxiliary secondary batteries, and the control module may be configured to, when the motor travel priority mode is set, control the main connect/disconnector so that the main secondary battery is connected to the side of the motor and control the auxiliary connect/disconnector so that the auxiliary secondary batteries are sequentially switched and connected.

In another preferable application of the hybrid vehicle of the invention, the hybrid vehicle may further have: a driving power setting module configured to set a driving power required for driving the hybrid vehicle; and an output limit setting module configured to set an output limit of the battery unit as a maximum allowable electric power to be output from the secondary battery connected to the side of the motor out of the at least one secondary battery of the battery unit, and the control module may be configured to, when the motor travel priority mode is set and the set driving power is less than or equal to a corresponding power to the set output limit of the battery unit, control the internal combustion engine and the motor so that the hybrid vehicle is driven with the motor travel, while controlling the internal combustion engine and the motor so that the hybrid vehicle is driven with the hybrid travel when the motor travel priority mode is set and the set driving power is more than the corresponding power to the set output limit of the battery unit.

In still another preferable application of the hybrid vehicle of the invention, the hybrid vehicle may further have: a generator constructed to input and output power and transmit electric power to and from the secondary battery of the battery unit; and a planetary gear mechanism with three elements each connected to three shafts, an output shaft of the internal combustion engine, a rotating shaft of the generator, and a driveshaft linked to an axle of the hybrid vehicle, and the control module may be configured to control the generator for operation control of the internal combustion engine.

According to another aspect, the present invention is directed to a control method of a hybrid vehicle having an internal combustion engine capable of outputting power for driving the hybrid vehicle and equipped in an exhaust system with a catalytic conversion unit including a purifying catalyst for purifying exhaust, a motor constructed to input and output power for driving the hybrid vehicle, a battery unit including at least one secondary battery designed to transmit electric power to and from the motor, and a charger connected to an external power supply in a system shutdown state of the hybrid vehicle to charge the secondary battery of the battery unit with electric power from the external power supply, when an accumulated charge ratio that is a ratio of an accumulated charge amount in the at least one secondary battery of the battery unit to a whole capacity of the at least one secondary battery of the battery unit is at least larger than a first preset ratio at system startup of the hybrid vehicle, the hybrid vehicle being driven with a motor travel priority mode in which motor travel where the hybrid vehicle is driven only with input and output power to and from the motor is prioritized between the motor travel and hybrid travel where the hybrid vehicle is driven with output power from the internal combustion engine and with the input and output power to and from the motor, while the hybrid vehicle being driven with a hybrid travel priority mode where the hybrid travel is prioritized between the motor travel and the hybrid travel when the hybrid vehicle is not driven with the motor travel priority mode until the accumulated charge ratio becomes less than a second preset ratio that is less than the first preset ratio. The control method of the hybrid vehicle including: when the accumulated charge ratio becomes less than a third preset ratio that is smaller than the first preset ratio and larger than the second preset ratio in a state that the purifying catalyst is not at a temperature where the purifying catalyst is activated during vehicle travelling with the motor travel priority mode to prioritize the motor travel, controlling the internal combustion engine and the motor so that the internal combustion engine is started up and the hybrid vehicle is driven with the motor travel priority mode while the internal combustion engine is operated in an appropriate state to warming up the purifying catalyst.

The control method of the hybrid vehicle according to this aspect of the invention, at system startup of the hybrid vehicle, when an accumulated charge ratio that is a ratio of an accumulated charge amount in the at least one secondary battery of the battery unit to a whole capacity of the at least one secondary battery of the battery unit is at least larger than a first preset ratio at system startup of the hybrid vehicle, the hybrid vehicle is driven with a motor travel priority mode in which motor travel where the hybrid vehicle is driven only with input and output power to and from the motor is prioritized between the motor travel and hybrid travel where the hybrid vehicle is driven with output power from the internal combustion engine and with the input and output power to and from the motor until the accumulated charge ratio becomes less than a second preset ratio that is less than the first preset ratio, while the hybrid vehicle being driven with a hybrid travel priority mode where the hybrid travel is prioritized between the motor travel and the hybrid travel when the hybrid vehicle is not driven with the motor travel priority mode. When the accumulated charge ratio becomes less than a third preset ratio that is smaller than the first preset ratio and larger than the second preset ratio in a state that the purifying catalyst is not at a temperature where the purifying catalyst is activated during vehicle travelling with the motor travel priority mode to prioritize the motor travel, the control method controls the internal combustion engine and the motor so that the internal combustion engine is started up and the hybrid vehicle is driven with the motor travel priority mode while the internal combustion engine is operated in an appropriate state to warming up the purifying catalyst. Accordingly, upon system shutdown of the vehicle before the accumulated charge ratio becomes less than the third preset ratio, the internal combustion engine is not started up to warm up the purifying catalyst. In comparison with a vehicle where the internal combustion engine is started up to warm up the purifying catalyst at system startup of the vehicle, fuel efficiency is enhanced. As a result, it is enabled that the internal combustion engine is started up at a more appropriate timing to warm up the purifying catalyst for purifying exhaust of the internal combustion engine. As a matter of course, it is prevented to worsen the exhaust emission when the hybrid vehicle is driven with the hybrid travel prioritized, after the accumulated charge ratio reaches the second preset ratio and the hybrid travel priority mode is set. In this arrangement, the 'third preset ratio' may be set so that the calculated accumulated charge ratio becomes the second preset ratio in a case that the hybrid vehicle is driven with the motor travel for a required time to warm up the purifying catalyst. Use of this 'third preset ratio' enables to complete warm-up of the purifying catalyst more certainly before the accumulated charge ratio reaches the second preset ratio and the hybrid travel priority mode is set.

In one preferable application of the control method of the hybrid vehicle, the battery unit may have at least one main secondary battery, at least one auxiliary secondary battery, a main connect/disconnector that connects and disconnects the at least one main secondary battery to and from a side of the motor, an auxiliary connect/disconnector that connects and disconnects the at least one auxiliary secondary battery to and from the side of the motor, a main step-up-down circuit that transmits electric power with voltage regulation between a main battery voltage system connected to the at least one main secondary battery and a high voltage system at the side of the motor, and an auxiliary step-up-down circuit that transmits electric power with voltage regulation between an auxiliary battery voltage system connected to the at least one auxiliary secondary battery and the high voltage system at the side of the motor, and when the hybrid vehicle is driven with the motor travel priority mode, the control method may be controlling the main connect/disconnector and the main step-up-down circuit so that the at least one main secondary battery is connected to the side of the motor and power from the at least one main secondary battery is supplied to the motor and controlling the auxiliary connect/disconnector and the auxiliary step-up-down circuit so that the at least one auxiliary secondary battery is connected to the side of the motor and power from the at least one auxiliary secondary battery is supplied to the motor, while controlling the main connect/disconnector and the main step-up-down circuit so that a connection between the at least one main secondary battery and the side of the motor is maintained and a transmission between electric power of the at least one main secondary battery and electric power of the side of the motor is performed and controlling the auxiliary connect/disconnector so that all of the at least one auxiliary secondary battery is disconnected from the side of the motor when the accumulated charge ratio becomes less than the second preset ratio during vehicle travelling with the motor travel priority mode and then the hybrid vehicle is driven with the hybrid travel priority mode. This arrangement enables to lengthen travelling distance by the motor travel under the motor travel priority mode and enables to increase output power at the motor travel under the motor travel priority mode. In this arrangement, the timing when the accumulated charge ratio becomes less than the third preset ratio during vehicle travelling upon setting the motor travel priority mode to prioritize the motor travel is a timing before disconnecting all of the auxiliary secondary battery from the side of the motor.

In another preferable application of the control method of the hybrid vehicle, when the hybrid vehicle is driven with the motor travel priority mode and a driving power required for driving the hybrid vehicle is less than or equal to a corresponding power to an output limit of the battery unit as a maximum allowable electric power to be output from the secondary battery connected to the side of the motor out of the at least one secondary battery of the battery unit, the control method may be controlling the internal combustion engine and the motor so that the hybrid vehicle is driven with the motor travel, while controlling the internal combustion engine and the motor so that the hybrid vehicle is driven with the hybrid travel when the motor travel priority mode is set and the driving power is more than the corresponding power to the output limit of the battery unit.

MODES FOR CARRYING OUT THE INVENTION

One mode for carrying out the invention is discussed below as a preferred embodiment.

Figure 1:
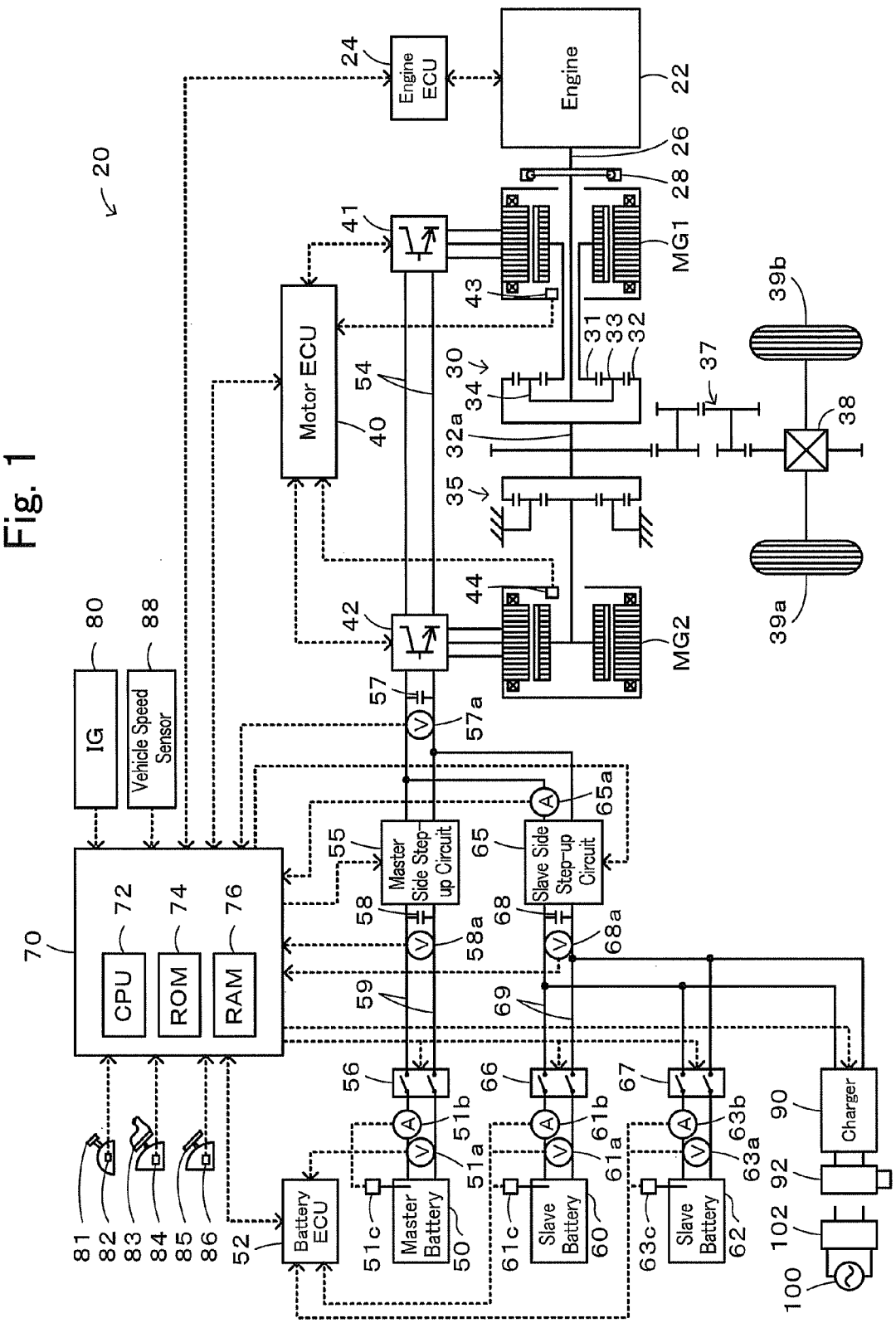
FIG. 1 schematically illustrates the configuration of a hybrid vehicle 20 in one embodiment of the invention.

FIG. 1 schematically illustrates the configuration of a hybrid vehicle 20 in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a reduction gear 35 to a ring gear shaft 32a or a driveshaft linked with the power distribution integration mechanism 30, inverters 41 and 42 each for driving the motors MG1 and MG2, a master battery 50 capable of charge and discharge, a master side step-up circuit 55 supplying electric power with voltage step-up from the master battery 50 to the inverters 41 and 42, a system main relay 56 connecting and disconnecting the master battery 50 to and from the master side step-up circuit 55, slave batteries 60 and 62 capable of charge and discharge, a slave side step-up circuit 65 supplying electric power with voltage step-up from the slave batteries 60 and 62 to the inverters 41 and 42, system main relays 66 and 67 each connecting and disconnecting each of the slave batteries 60 and 62 to and from the slave side step-up circuit 65, and a hybrid electronic control unit 70 configured to control the operations of the whole hybrid vehicle 20. For convenience of explanation, the side of the inverters 41 and 42 from the master side step-up circuit 55 and the slave side step-up circuit 65 is described as a high-voltage system, the side of the master battery 50 from the master side step-up circuit 55 is described as a first low-voltage system, and the side of the slave batteries 60 and 62 from the slave side step-up circuit 65 is described as a second low-voltage system hereafter.

Figure 2:
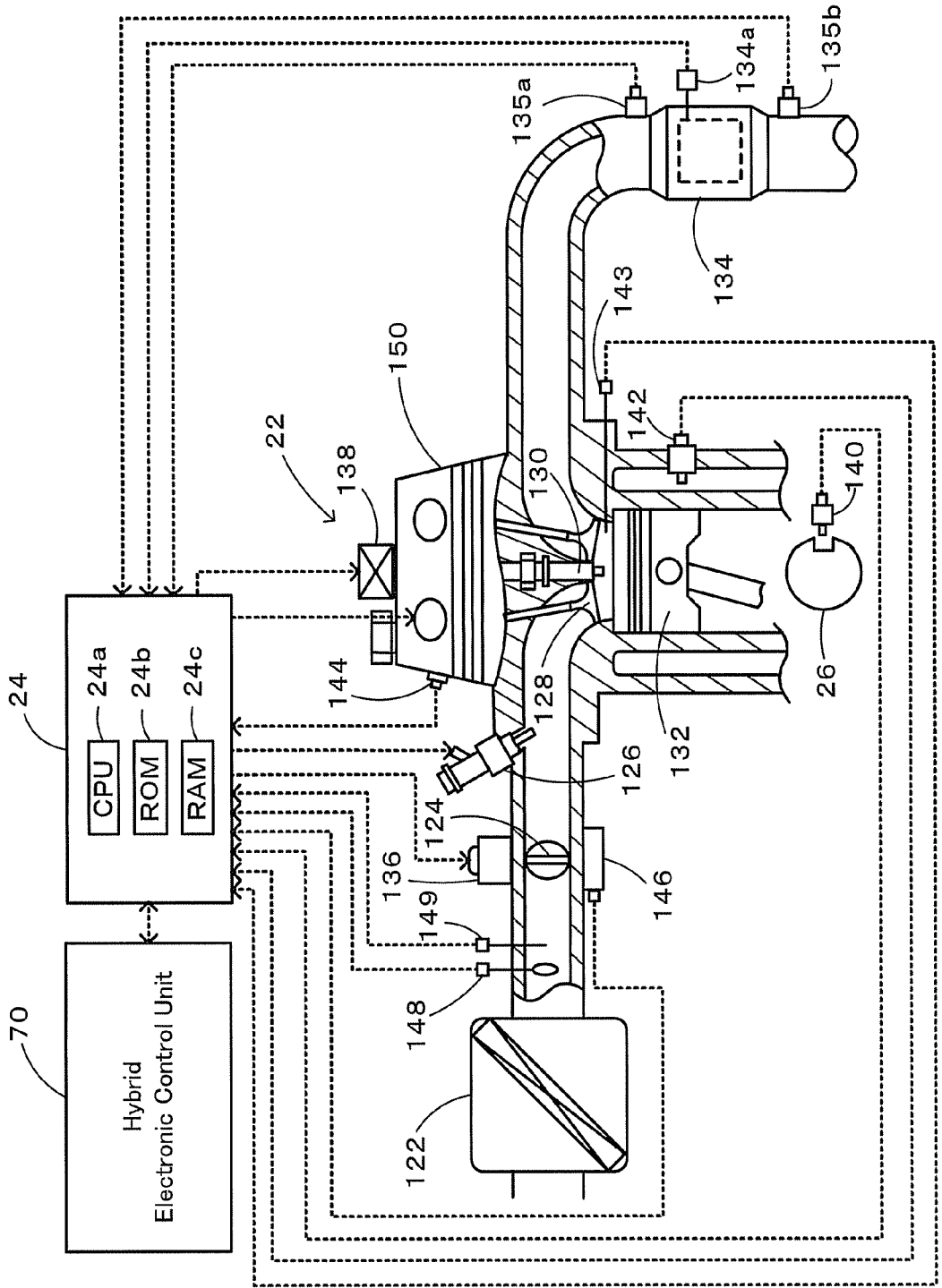
FIG. 2 is a schematic view showing the structure of an engine 22.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature Tw from a water temperature sensor 142 measured as the temperature of cooling water in the engine 22, an in-cylinder pressure Pin from a pressure sensor 143 located inside the combustion chamber, cam positions from a cam position sensor 144 detected as the rotational positions of camshafts driven to open and close the intake valve 128 and an exhaust valve for gas intake and exhaust into and from the combustion chamber, a throttle position SP from a throttle valve position sensor 146 detected as the position of the throttle valve 124, an intake air amount Qa from an air flow meter 148 located in the air intake conduit, an intake air temperature Ta from a temperature sensor 149 located in the air intake conduit, a catalyst temperature Tc from a temperature sensor 134a located in the catalytic converter 134, an air-fuel ratio AF from the air-fuel ratio sensor 135a, and an oxygen signal O2 from the oxygen sensor 135b. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs several arithmetic operations, for example, to compute a rotation speed of the crankshaft 26 or a rotation speed Ne of the engine 22 from the crank position input from the crank position sensor 140, and to compute volumetric efficiency KL (the ratio of air volume actually taken in a cycle into the engine 22 to a piston displacement per a cycle of the engine 22) from the intake air amount Qa from the air flow meter 148 and the rotation speed Ne of the engine 22.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via a gear mechanism 37 and a differential gear 38 from ring gear shaft 32a.

Both the motors MG1 and MG2 are known synchronous motor generators that are driven as a generator and as a motor. The motors MG1 and MG2 transmit electric power to and from the master battery 50 via the inverters 41 and 42 and the master side step-up circuit 55, and transmit electric power to and from the slave batteries 60 and 62 via the inverters 41 and 42 and the slave side step-up circuit 65. Power lines (hereafter referred to as high-voltage system power lines) 54 that connect the inverters 41 and 42 with the master side step-up circuit 55 and the slave side step-up circuit 65 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Both the master side step-up circuit 55 and the slave side step-up circuit 65 are known step-up/down converter. The master side step-up circuit 55 is connected to power lines (hereafter referred to as first low-voltage system power lines) 59 that are connected via the system main relay 56 to the master battery 50, and the above described high-voltage system power lines 54. The master side step-up circuit 55 steps up the voltage of electric power from the master battery 50 to supply the electric power to the inverters 41 and 42, and steps down the voltage of electric power applied to the inverters 41 and 42 to charge the master battery 50. The slave side step-up circuit 65 is connected to power lines (hereafter referred to as second low-voltage system power lines) 69 that are connected via the system main relay 66 to the slave battery 60 and via the system main relay 67 to the slave battery 62, and the high-voltage system power lines 54. The slave side step-up circuit 65 steps up the voltage of electric power from a slave battery (hereafter referred to as connection side slave battery) which is connected to the slave side step-up circuit 65 between the slave batteries 60 and 62 to supply the electric power to the inverters 41 and 42, and steps down the voltage of electric power applied to the inverters 41 and 42 to charge the connection side slave battery. A smoothing capacitor 57 is connected to the positive electrode bus line and negative electrode bus line of the high-voltage system power lines 54, a smoothing capacitor 58 is connected to the positive electrode bus line and negative electrode bus line of the first low-voltage system power lines 59, and a smoothing capacitor 68 is connected to the positive electrode bus line and negative electrode bus line of the second low-voltage system power lines 69.

Figure 3:
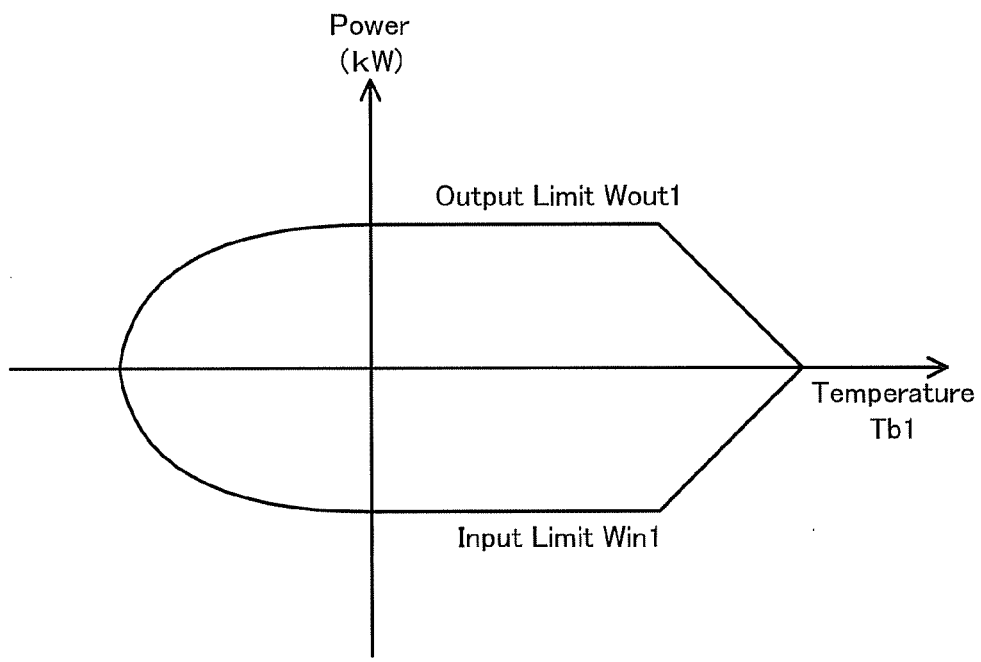
FIG. 3 shows variations of an input limit Win1 and an output limit Wout1 against battery temperature Tb1 of a master battery 50.
Figure 4:
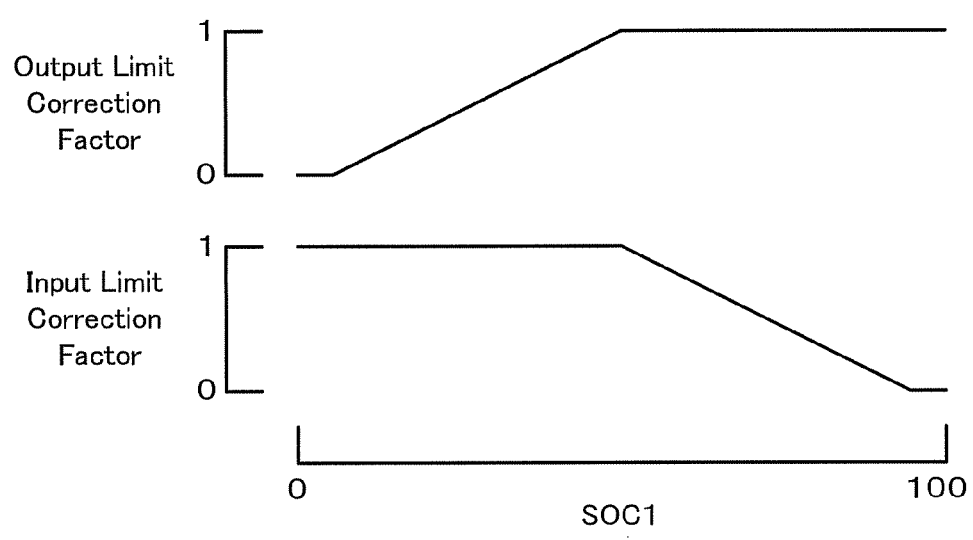
FIG. 4 shows variations of respective correction factors of the input limit Win1 and the output limit Wout1 against accumulated charge amount SOC1 of the master battery 50.

All of the master battery 50 and the slave batteries 60 and 62 are constructed as lithium-ion secondary batteries, and are under control of a battery electronic control unit (hereafter referred to as battery ECU) 52. The battery ECU 52 receives diverse signals required for control of the master battery 50 and the slave batteries 60 and 62, for example, an inter-terminal voltage Vb1 measured by a voltage sensor 51a disposed between terminals of the master battery 50, a charge-discharge current Ib1 measured by a current sensor 51b attached to an output terminal at the positive pole side of the master battery 50, a battery temperature Tb1 measured by a temperature sensor 51c attached to the master battery 50, inter-terminal voltages Vb2 and Vb3 measured by voltage sensors 61a and 63a disposed respectively between terminals of the slave batteries 60 and 62, charge-discharge currents Ib2 and Ib3 measured by current sensors 61b and 63b attached respectively to output terminals at the positive pole side of the slave batteries 60 and 62, and a battery temperatures Tb2 and Tb3 measured by temperature sensors 61c and 63c attached respectively to the slave batteries 60 and 62. The battery ECU 52 outputs data relating to each state of the master battery 50 and the slave batteries 60 and 62 to the hybrid electronic control unit 70 via communication according to the requirements. The battery ECU 52 performs various arithmetic operations for management and control of the master battery 50. An accumulated charge amount SOC1 of the master battery 50 is calculated from an integrated value of the charge-discharge current Ib1 measured by the current sensor 51b. An input limit Win1 as an allowable charging electric power to be charged in the master battery 50 and an output limit Wout1 as an allowable discharging electric power to be discharged from the master battery 50 are set corresponding to the calculated accumulated charge amount SOC1 and the battery temperature Tb1. The battery ECU 52 performs various arithmetic operations for management and control of the slave batteries 60 and 62. Accumulated charge amounts SOC2 and SOC3 of the slave batteries 60 and 62 are calculated from integrated values of the charge-discharge currents Ib2 and Ib3 measured by the current sensors 61b and 63b. Input limits Win2 and Win3 as allowable charging electric powers to be charged in the slave batteries 60 and 62 and output limits Wout2 and Wout3 as allowable discharging electric powers to be discharged from the slave batteries 60 and 62 are set corresponding to the calculated accumulated charge amount SOC2 and SOC3 and the battery temperatures Tb2 and Tb3. The battery ECU 52 also performs arithmetic operations for calculating an accumulated charge ratio SOC that is a ratio of the sum of the calculated accumulated charge amount SOC1, 50C2, and SOC3 to the total capacity of the master battery 50 and the slave batteries 60 and 62. A concrete procedure of setting the input and output limits Win1 and Wout1 of the master battery 50 sets base values of the input limit Win1 and the output limit Wout1 corresponding to the battery temperature Tb1, specifies an input limit correction factor and an output limit correction factor corresponding to the accumulated charge amount SOC1 of the master battery 50, and multiplies the base values of the input limit Win1 and the output limit Wout1 by the specified input limit correction factor and output limit correction factor to determine the input limit Win1 and the output limit Wout1 of the master battery 50. FIG. 3 shows variations of the input limit Win1 and the output limit Wout1 against battery temperature Tb1 of the master battery 50. FIG. 4 shows variations of correction factors of the input limit Win1 and the output limit Wout1 against accumulated charge amount SOC1 of the master battery 50. The input and output limits Win2 and Wout2 of the slave battery 60 and the input and output limits Win3 and Wout3 of the slave battery 62 are set as well as the input and output limits Win1 and Wout1 of the master battery 50. In this embodiment, the master battery 50 and the slave batteries 60 and 62 have the same rated capacity and the same characteristic of battery temperature.

A charger 90 is connected to the second low-voltage system in parallel with the slave batteries 60 and 62 against the slave side step-up circuit 65, and a vehicle side connector 92 is connected to the charger 90. The vehicle side connector 92 is constructed capable of connecting an external power supply side connector 102 connected to an external power supply of AC (for example, domestic power supply (AC 100V)) 100 that is a power supply at the outside of the vehicle. The charger 90 includes a charging relay that makes connection and disconnection between the second low-voltage system and the vehicle side connector 92, an AC-to-DC converter that converts AC power from the external power supply 100 to DC power, and a DC-to-DC converter that regulates the voltage of the DC power converted by the AC-to-DC converter to supply the power to the second low-voltage system.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57a disposed between terminals of the capacitor 57, a voltage (voltage of the first low-voltage system) VL1 measured by a voltage sensor 58a disposed between terminals of the capacitor 58, a voltage (voltage of the second low-voltage system) VL2 measured by a voltage sensor 68a disposed between terminals of the capacitor 68, an ignition signal from an ignition switch 80, a slave side current Ibs measured by a current sensor 65a attached to a terminal at the side of the high-voltage system power lines 54 of the slave side step-up circuit 65, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs various signals via the output port: switching control signals to switching elements of the master side step-up circuit 55, switching control signals to switching elements of the slave side step-up circuit 65, driving signals to the system main relays 56, 66 and 67, control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging any of the master battery 50 and the slave batteries 60 and 62 or supplied by discharging any of the master battery 50 and the slave batteries 60 and 62, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of any of the master battery 50 and the slave batteries 60 and 62. The motor drive mode stops the operations of the engine 22 and drives and controls the motor MG2 to output a quantity of power equivalent to the required level of power to the ring gear shaft 32a. For convenience of explanation, vehicle travelling only with input and output power to and from the motor MG2 is described as motor travel, and vehicle travelling with output power from the engine 22 and with the input and output power to and from the motor MG2 is described as hybrid travel hereafter.

Figure 5:
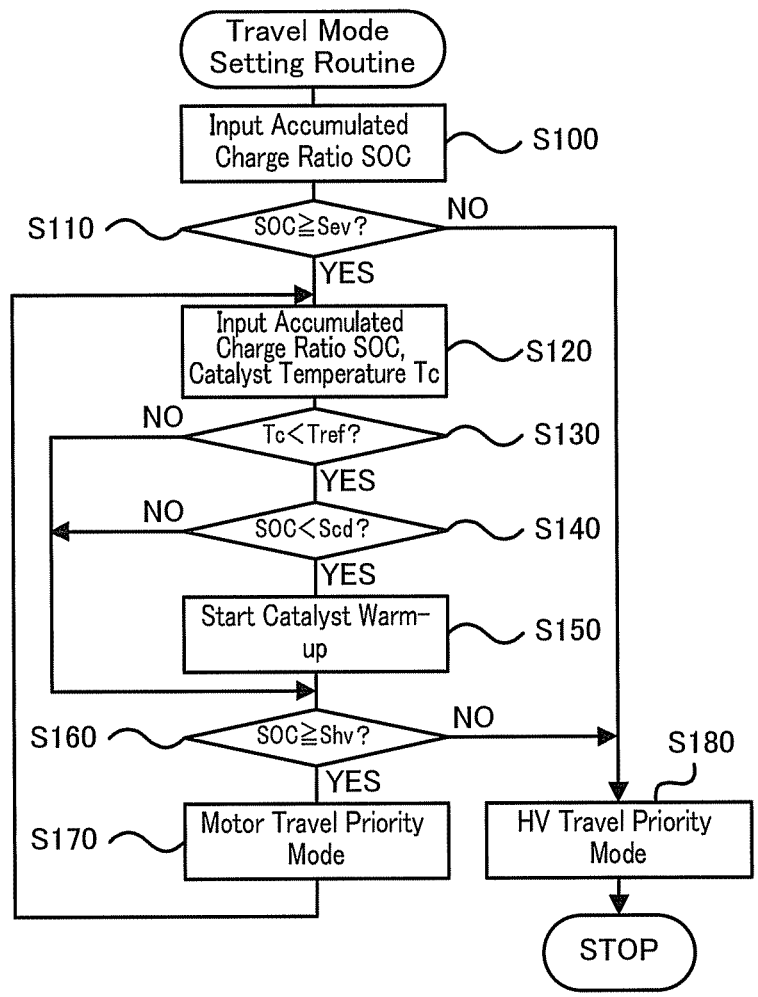
FIG. 5 is a flowchart showing a travel mode setting routine executed by a hybrid electronic control unit 70 in the embodiment.

In the hybrid vehicle 20 of the embodiment, upon connection between the external power supply side connector 102 and the vehicle side connector 92 after system shutdown of the vehicle at home or at a predetermined charging point, the charging relay in the charger 90 is switched to ON. The master battery 50 and the slave batteries 60 and 62 are then brought to each fully charged state or a preset charge state that is less charged state than the fully charged state (for example, each state of the accumulated charge amounts SOC1, SOC2, and SOC3 equal to 80% or 85%), by switching ON/OFF the system main relays 56, 66 and 67 and controlling the master side step-up circuit 55, the slave side step-up circuit 65, and the AC-to-DC converter and DC-to-DC converter in the charger 90. When the vehicle system is started up (by ignition on) at the state of the master battery 50 and the slave batteries 60 and 62 being charged enough as described and vehicle travelling is started, it is enabled to drive the hybrid vehicle 20 for some extent of distance (time) with the motor travel using electric power from the master battery 50 and the slave batteries 60 and 62. In the hybrid vehicle 20 of the embodiment, the slave batteries 60 and 62 are included in addition to the master battery 50, and it is thus enabled to have a longer travelling distance (travelling time) for driving the hybrid vehicle 20 with the motor travel in comparison with a vehicle only including the master battery 50. When the vehicle system is started up after charging the battery 50, the processings as shown in a travel mode setting routine of FIG. 5 are executed. When the accumulated charge ratio SOC at system startup of the hybrid vehicle 20 is more than or equal to a threshold value Sev (for example, 40% or 50%) that is predetermined as an accumulated charge ratio SOC allowing some extent of the motor travel, a motor travel priority mode is set. In the motor travel priority mode, the hybrid vehicle 20 is driven to give priority to travelling in the motor drive mode (the motor travel). Next, the hybrid vehicle 20 travels until the accumulated charge ratio SOC reaches a threshold value Shv (for example, 20% or 30%) that is predetermined to enable starting up the engine 22 adequately (steps S100 through S170). In other words, after determination that the accumulated charge ratio SOC at the system startup of the hybrid vehicle 20 is more than or equal to the threshold value Sev, the accumulated charge ratio SOC may decrease. Once the accumulated charge ratio SOC is less than the threshold value Sev and it reaches the threshold value Shv, a hybrid travel priority mode is set, where the hybrid vehicle 20 is driven to give priority to travelling in the engine drive mode (the hybrid travel), and the hybrid vehicle 20 travels (step S180). During vehicle travelling with the setting of the motor travel priority mode, the accumulated charge ratio SOC decreases. When the accumulated charge ratio SOC becomes less than a threshold value Scd that is smaller than the threshold value Sev and larger than the threshold value Shv, catalyst temperature Tc from the temperature sensor 134a located in the catalytic converter 134 is determined. If catalyst temperature Tc is less than a threshold value Tref, which is as a lower limit temperature to activate the threeway catalyst (steps S130 and S140), the engine 22 is started up and brought to an operation state appropriate to warming up the three-way catalyst and the hybrid vehicle 20 continues travelling in the motor travel priority mode (step 150). The threshold value Scd is set so that the accumulated charge ratio SOC reaches the threshold value Shv in the case that the hybrid vehicle 20 is driven with the motor travel for a predetermined time as a required time to warm up the three-way catalyst. In this embodiment, the threshold value Scd is set so that the accumulated charge ratio SOC reaches the threshold value Shv in the case that the hybrid vehicle 20 is driven with the maximum power in the motor travel for the predetermined time as the required time to warm up the three-way catalyst.

Figure 6:
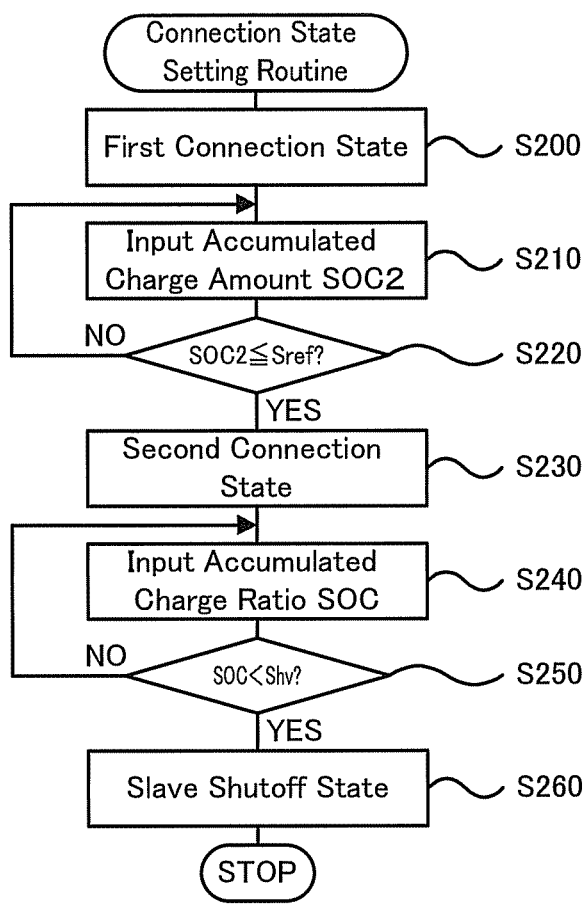
FIG. 6 is a flowchart showing a connection state setting routine executed by a hybrid electronic control unit 70 in the embodiment.

In the hybrid vehicle 20 of the embodiment, in the case that the hybrid vehicle 20 is driven with the motor travel priority mode, each connection state of the master battery 50 and the slave batteries 60 and 62 is switched by a connection state setting routine shown as one example in FIG. 6. This routine is executed by the hybrid electronic control unit 70. In the connection state setting routine, when the vehicle system is started up (by ignition on) at the state of the master battery 50 and the slave batteries 60 and 62 being charged enough with the electric power from the external power supply 100, the CPU 72 of the hybrid electronic control unit 70 switches the system main relays 56 and 66 to ON and leads to a first connection state (where the master battery 50 and the master side step-up circuit 55 are connected and the slave battery 60 and the slave side step-up circuit 65 are connected) (step S200). The hybrid vehicle 20 is driven with the motor travel priority mode by a step-up circuit control described later in which the master side step-up circuit 55 and the slave side step-up circuit 65 are controlled so that the accumulated charge amount SOC2 of the slave battery 60 decreases faster than the accumulated charge amount SOC1 of the master battery 50. When the accumulated charge amount SOC2 of the slave battery 60 becomes less than or equal to a threshold value Sref (steps S210 and S220), the CPU 72 switches the system main relay 66 to OFF and the system main relay 67 to ON to change from the first connection state to a second connection state (where the slave battery 60 and the slave side step-up circuit 65 are disconnected and the slave battery 62 and the slave side step-up circuit 65 are connected) (step S230). The threshold value Sref is set as an accumulated charge amount which is the accumulated charge amount SOC2 of the slave battery 60 converted to an accumulated charge ratio equivalent to the threshold value Shv. When the accumulated charge ratio SOC becomes less than or equal to the threshold value Shv with vehicle travelling in the motor travel priority mode under control of the master side step-up circuit 55 and the slave side step-up circuit 65 (steps S240 and S250), the CPU 72 switches the system main relay 67 to OFF to change from the second connection state to a slave shutoff state (where the slave battery 62 and the slave side step-up circuit 65 are disconnected) (step S260). The CPU 72 then terminates this routine. In the slave shutoff state, the hybrid vehicle 20 is driven with intermittent operations of the engine 22 based on a power demand required for the vehicle (power demand Pe* described later). In the hybrid vehicle 20 of the embodiment, when the vehicle system is started up at the state of the master battery 50 and the slave batteries 60 and 62 being not charged with electric power from the external power supply 100, the vehicle travelling is started at any of the first connection state, the second connection state, or the slave shutoff state according to the accumulated charge amounts SOC1, SOC2 and SOC3 of the master battery 50 and the slave batteries 60 and 62.

Figure 7:
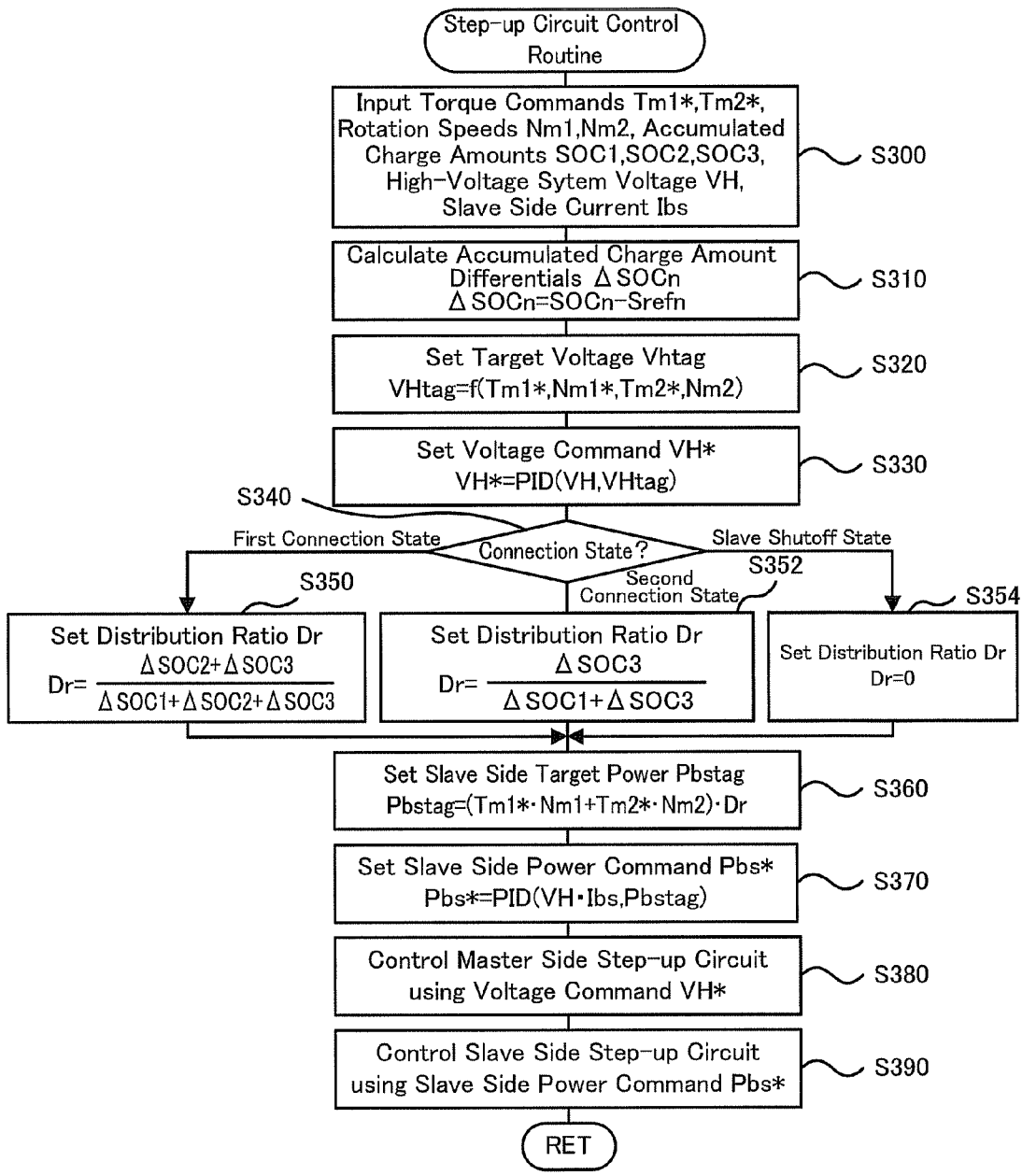
FIG. 7 is a flowchart showing a step-up circuit control routine executed by the hybrid electronic control unit 70 in the embodiment.

In the hybrid vehicle 20 of the embodiment, the master side step-up circuit 55 and the slave side step-up circuit 65 are controlled by a step-up circuit control routine shown as one example in FIG. 7. This routine is executed repeatedly at preset time intervals (for example, at every several msec) by the hybrid electronic control unit 70. In the step-up circuit control routine, the CPU 72 of the hybrid electronic control unit 70 inputs various data required for control, for example, torque commands Tm1* and Tm2* of the motors MG1 and MG2, the rotation speeds Nm1 and Nm2 of the motors MG1 and MG2, the accumulated charge amount SOC1 of the maser battery 50, the accumulated charge amounts SOC2 and SOC3 of the slave batteries 60 and 62, the voltage VH of the high-voltage system from the voltage sensor 57a, and the slave side current Ibs from the current sensor 65a (step S300). The CPU 72 calculates accumulated charge amount differentials ΔSOC1, ΔSOC2 and ΔSOC3 from subtracting preset accumulated charge amounts Sref1, Sref2 and Sref3 respectively from the accumulated charge amount SOC1 of the master battery 50 and the accumulated charge amounts SOC2 and SOC3 of the slave batteries 60 and 62 (step S310). The torque commands Tm1* and Tm2* of the motor MG1 and MG2 are set in a drive control routine described later and are input. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The accumulated charge amount SOC1 of the master battery 50 and the accumulated charge amounts SOC2 and SOC3 of the slave batteries 60 and 62 are computed from the integrated values of the charge-discharge currents Ib1, Ib2 and Ib3 measured by the current sensors 51b, 61b and 63b and are input from the battery ECU 52 by communication. The preset accumulated charge amounts Sref1, Sref2 and Sref3 are set as accumulated charge amounts which are the accumulated charge amount SOC1 of the master battery 50 and the accumulated charge amounts SOC2 and SOC3 of the slave batteries 60 and 62 each converted to an accumulated charge ratio equivalent to the threshold value Shv.

The CPU 72 subsequently sets a target voltage VHtag of the high-voltage system power lines 54 based on the torque commands Tm1* and Tm2* and the rotation speeds Nm1 and Nm2 of the motors MG1 and MG2 (step S320), and sets a voltage command VH* used for control of the master step-up circuit 55 by voltage feedback control to bring the voltage VH of the high-voltage system to the target voltage VHtag (step S330). The target voltage VHtag is set to the larger one between a voltage enabling to drive the motor MG1 at the target operation point (the torque command Tm1*, the rotation speed Nm1) of the motor MG1 and a voltage enabling to drive the motor MG2 at the target operation point (the torque command Tm2*, the rotation speed Nm2).

The CPU 72 next determines the connection state set in the connection state setting routine of FIG. 6 (step S340). At the first connection state, a distribution ratio Dr is calculated from the accumulated charge amount differentials ΔSOC1, ΔSOC2 and ΔSOC3 of the master battery 50 and the slave batteries 60 and 62, according to Equation (1) given below (step S350). The distribution ratio Dr is a ratio of electric power to be supplied to the side of the motors MG1 and MG2 from the slave battery 60 to the sum of electric power to be supplied to the side of the motors MG1 and MG2 from the master battery 50 and the electric power to be supplied to the side of the motors MG1 and MG2 from the slave battery 60. At the second connection state, the distribution ratio Dr is calculated from the accumulated charge amount differentials ΔSOC1 and ΔSOC3 of the master battery 50 and the slave battery 62, according to Equation (2) given below (step S352). At the slave shutoff state, the distribution ratio Dr is set to value 0 (step S354). The reason for calculating the distribution ratio Dr in this way is to have a timing when the accumulated charge amount SOC1 of the master battery 50 becomes the preset accumulated charge amount Sref1 as the same timing as a timing when the accumulated charge amount SOC3 of the slave battery 62 becomes the preset accumulated charge amount Sref3, and to bring the accumulated charge ratio SOC to the threshold value Shv at that same timing.

$$Dr=(\Delta SOC2+\Delta SOC3)/(\Delta SOC1+\Delta SOC2+\Delta SOC3) \quad (1)$$

$$Dr=\Delta SOC3/(\Delta SOC1+\Delta SOC3) \quad (2)$$

The CPU 72 calculates a slave side target power Pbstag to be supplied to the side of the motors MG1 and MG2 from the side of the slave batteries 60 and 62, from multiplying the sum of power consumptions in the motors MG1 and MG2 by the distribution ratio. Dr according to Equation (3) given below (step S360), and sets a slave side power command Pbs* by power feedback control to bring the electric power (VH·Ibs) supplied from the slave side to the slave side target power Pbstag (step S370). The CPU 72 controls the master side step-up circuit 55 so that the voltage VH of the high-voltage system power lines 54 becomes the target voltage VHtag using the voltage command VH* (step S380), and controls the slave side step-up circuit 65 so that the electric power supplied from the slave batteries 60 and 62 to the side of the motors MG1 and MG2 becomes the slave side electric power demand Pbs* using the slave side electric power demand Pbs* (step S390). The step-up circuit control routine is then terminated. This control enables regulation of the voltage VH of the high-voltage system power lines 54, and regulations of the electric power supplied from the master battery 50 to the side of the inverters 41 and 42 and the electric power supplied from the connection side slave battery to the side of the inverters 41 and 42.

$$Pbstag=(Tm1*\cdot Nm1+Tm2*\cdot Nm2)\cdot Dr \quad (3)$$

Figure 8:
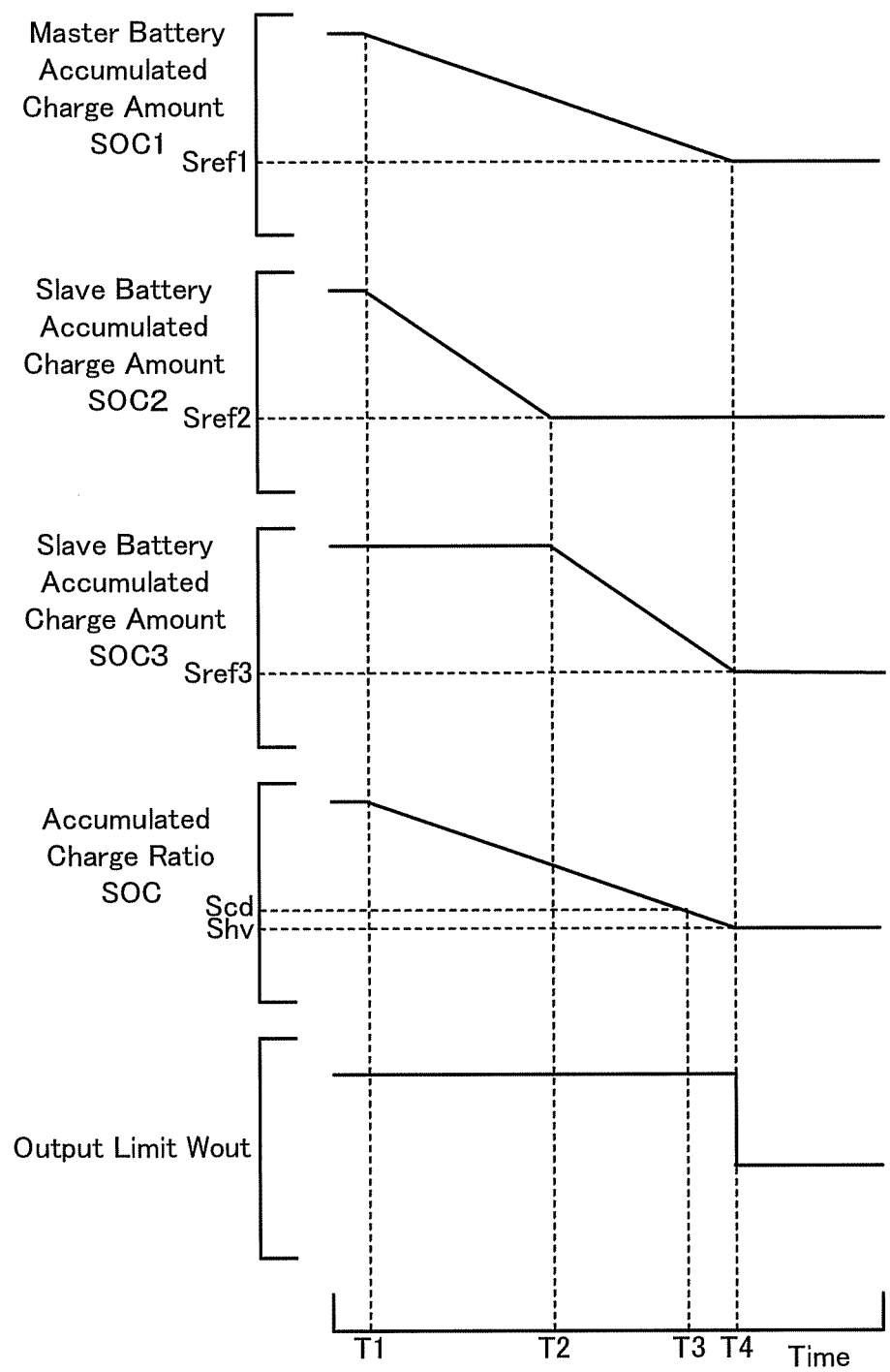
FIG. 8 shows one set of examples of time charts of an accumulated charge amount SOC1 of the master battery 50, an accumulated charge amounts SOC2 and SOC3 of slave batteries 60 and 62, an accumulated charge ratio SOC, and the output limit Wout in the case the hybrid vehicle 20 is driven equally to perform the motor travel in the motor drive priority mode.

FIG. 8 shows one set of examples of time charts of the accumulated charge amount SOC1 of the master battery 50, the accumulated charge amounts SOC2 and SOC3 of the slave batteries 60 and 62, the accumulated charge ratio SOC, and the output limit Wout in the case the hybrid vehicle 20 is driven equally to perform the motor travel in the motor travel priority mode. The output limit Wout is equivalent to the sum of the output limit Wout1 of the master battery 50 and the output limit of one connected slave battery, that is, equivalent to the sum of the output limit Wout1 of the master battery 50 and the output limit Wout2 of the slave battery 60 in the first connection state, equivalent to the sum of the output limit Wout1 of the master battery 50 and the output limit Wout3 of the slave battery 62 in the second connection state, and equivalent to the output limit Wout1 of the master battery 50 in the slave shutoff state. As shown in the figure, the master battery 50 and the slave battery 60 are discharged in the first connection state from the time T1 of travelling start, and both the accumulated charge amount SOC1 of the master battery 50 and the accumulated charge amount SOC2 of the slave battery 60 are decreased. The electric power supplied from the slave battery 60 to the side of the motors MG1 and MG2 is in accordance with the distribution ratio Dr calculated as shown in Equation (1) and is larger than the electric power supplied from the master battery 50 to the side of the motors MG1 and MG2. The decrease in the accumulated charge amount SOC2 of the slave battery 60 is thus faster than the decrease in the accumulated charge amount SOC1 of the master battery 50. At the time T2 when the accumulated charge amount SOC2 of the slave battery 60 reaches the preset accumulated charge amount Sref2, the first connection state is changed to the second connection state. The master battery 50 and the slave battery 62 are discharged, and both the accumulated charge amount SOC1 of the master battery 50 and the accumulated charge amount SOC3 of the slave battery 62 are decreased. At this time, the electric power supplied from the slave battery 62 to the side of the motors MG1 and MG2 is in accordance with the distribution ratio Dr calculated as shown in Equation (2) and is larger than the electric power supplied from the master battery 50 to the side of the motors MG1 and MG2. The decrease in the accumulated charge amount SOC3 of the slave battery 62 is thus faster than the decrease in the accumulated charge amount SOC1 of the master battery 50. At the time T4 when the accumulated charge amount SOC1 of the master battery 50 reaches the preset accumulated charge amount Sref1 and the accumulated charge amount SOC3 of the slave battery 62 reaches the preset accumulated charge amount Sref3, the accumulated charge ratio SOC reaches the threshold value Shv leading to the slave shutoff state and the motor travel priority mode is changed to the hybrid travel priority mode. The timing when the accumulated charge ratio SOC becomes less than the threshold value Scd, that is, the timing when the engine 22 is started up to start warm-up of the three-way catalyst is the time T3 which is a little before the time T4 when the second connection state is changed to the slave shutoff state. The catalyst warm-up is thus performed before the output limit Wout is sharply decreased.

Figure 9:
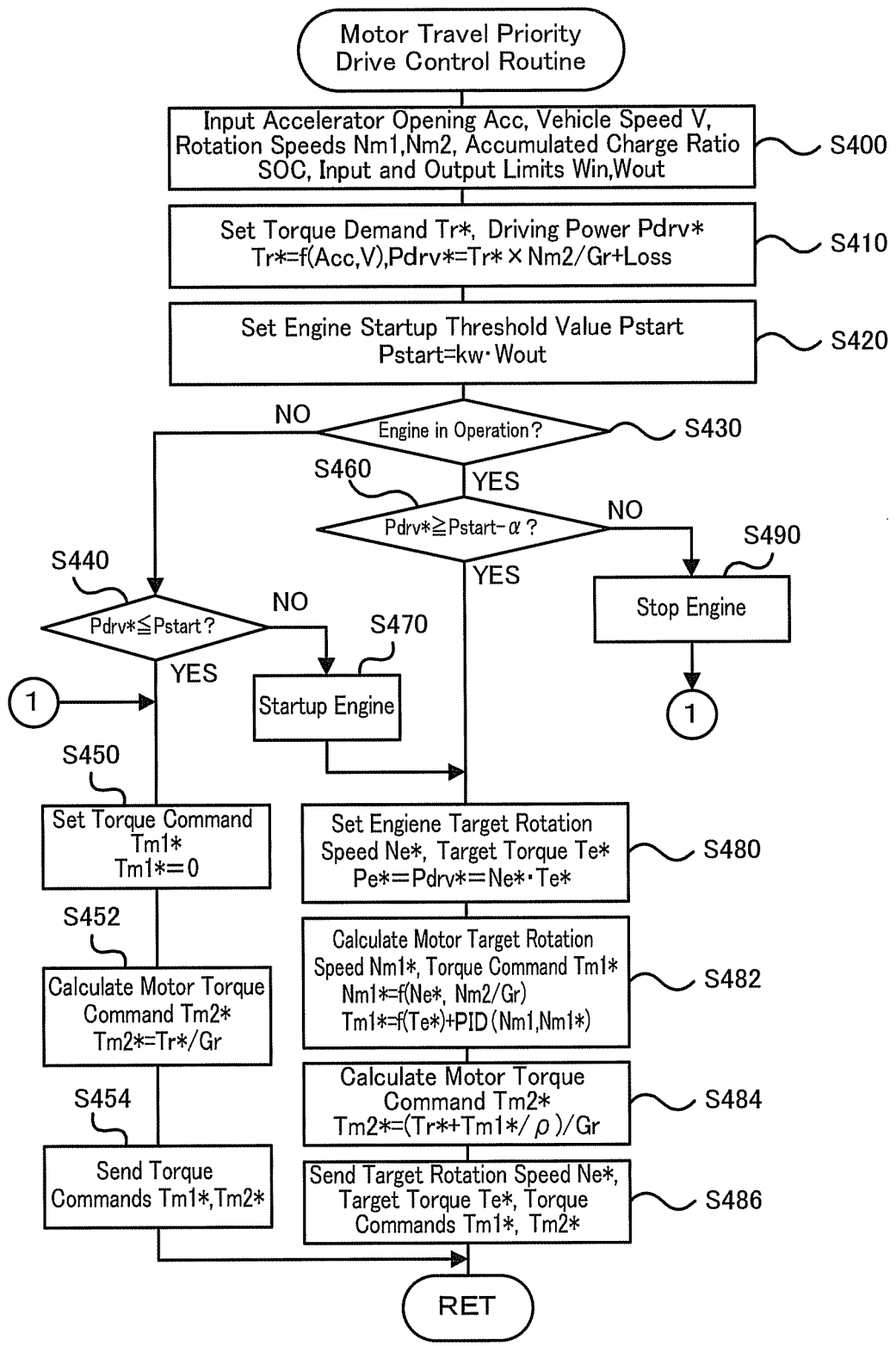
FIG. 9 is a flowchart showing a motor travel priority drive control routine executed by a hybrid electronic control unit 70 in the embodiment.
Figure 10:
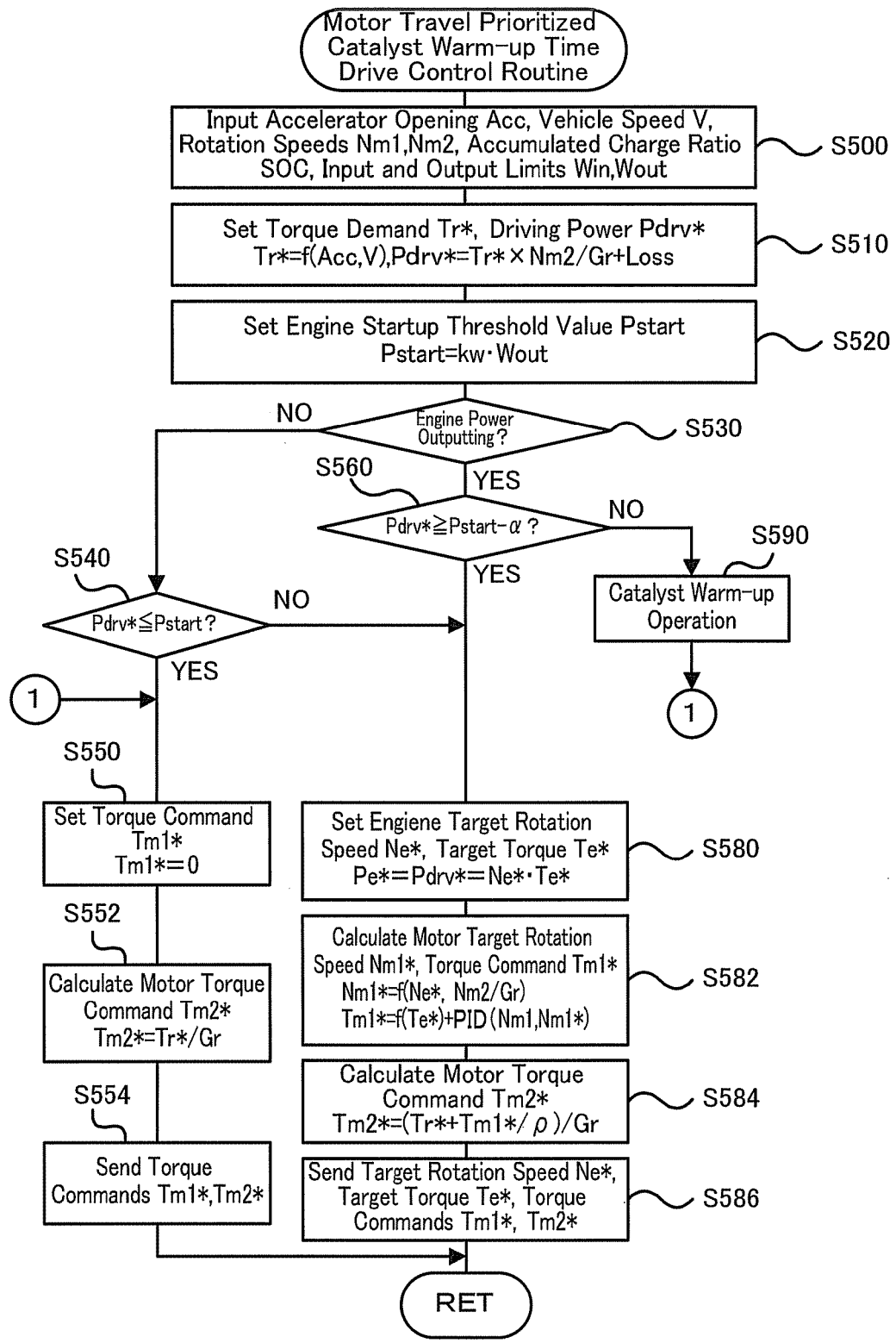
FIG. 10 is a flowchart showing a motor travel prioritized catalyst warm-up time drive control routine executed by a hybrid electronic control unit 70 in the embodiment.
Figure 11:
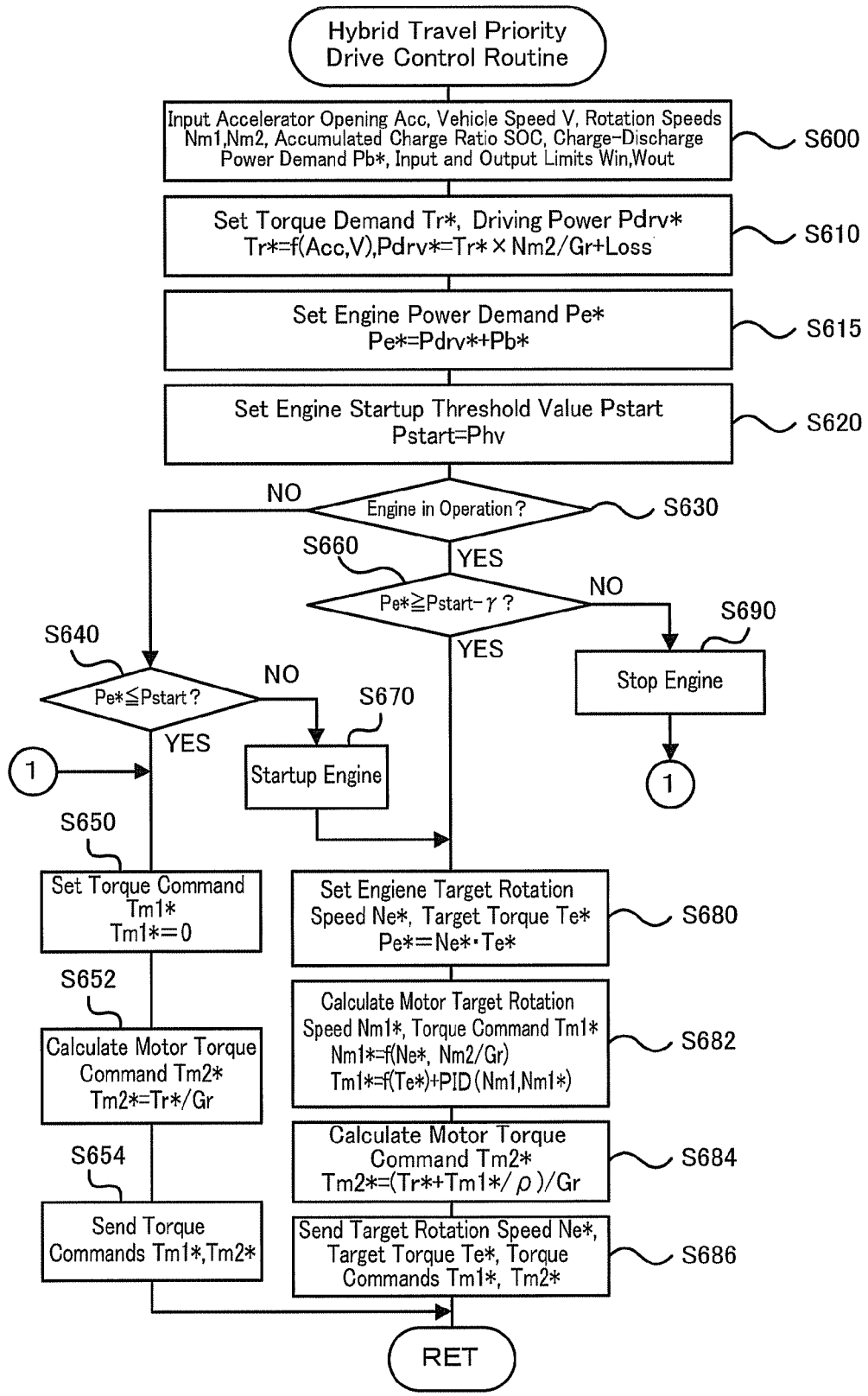
FIG. 11 is a flowchart showing a hybrid travel priority drive control routine executed by a hybrid electronic control unit 70 in the embodiment.

The description regards the drive control in the hybrid vehicle 20 of the embodiment. FIG. 9 is a flowchart showing a motor travel priority drive control routine executed by the hybrid electronic control unit 70 during the vehicle travelling in the motor travel priority mode. FIG. 10 is a flowchart showing a motor travel prioritized catalyst warm-up time drive control routine executed by the hybrid electronic control unit 70 during the vehicle travelling in the motor travel priority mode with warm-up of the three-way catalyst. FIG. 11 is a flowchart showing a hybrid travel priority drive control routine executed by the hybrid electronic control unit 70 during the vehicle travelling in the hybrid travel priority mode. As for the connection state, the motor travel priority drive control routine of FIG. 9 is executed in the first connection state and the second connection state, the motor travel prioritized catalyst warm-up time drive control routine of FIG. 10 is executed in the second connection state, and the hybrid travel priority drive control routine of FIG. 11 is executed in the slave shutoff state. These are described below in turn.

Figure 12:
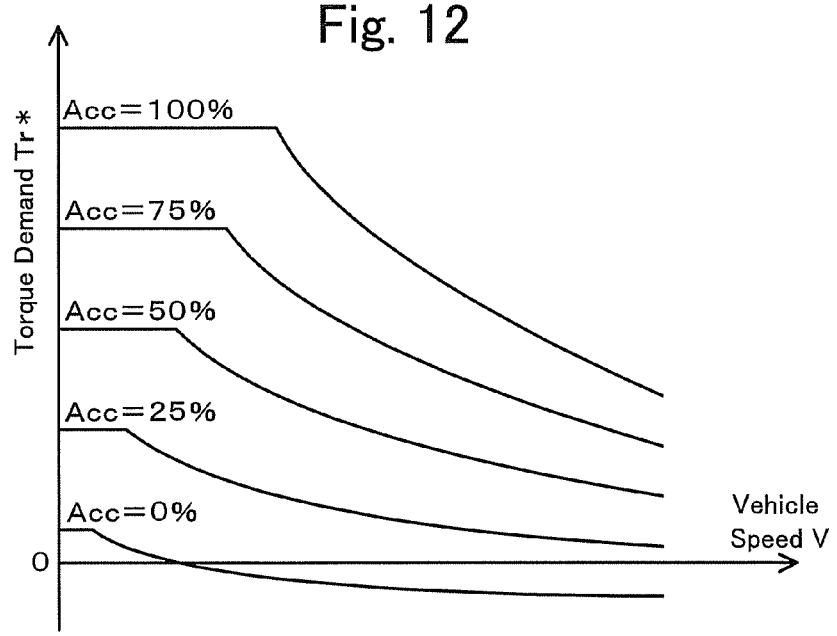
FIG. 12 shows one example of a torque demand setting map.

In the motor travel priority drive control routine of FIG. 9, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC, and the input and output limits Win and Wout (step S400). The CPU 72 sets a torque demand Tr* to be output to the ring gear shaft 32a or the driveshaft linked with the drive wheels 63a and 63b as a torque required for the hybrid vehicle 20 based on the input accelerator opening Acc and the input vehicle speed V, and a driving power Pdrv* required for driving the hybrid vehicle 20 (step S410). The CPU 72 obtains a value from multiplying the output limit Wout by a preset conversion factor kw for converting electric power to power for a driving system of the hybrid vehicle 20 and sets the value as a threshold value Pstart for starting up the engine 22 (step S420). The input limit Win is the sum of the input limit Win1 of the master battery 50 and the input limit of the connected slave battery, as with the output limit Wout. A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 12. The driving power Pdrv* is calculated as the sum of the product of the set torque demand Tr* and a rotation speed Nr of the ring gear shaft 32a, and a potential loss Loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

Figure 13:
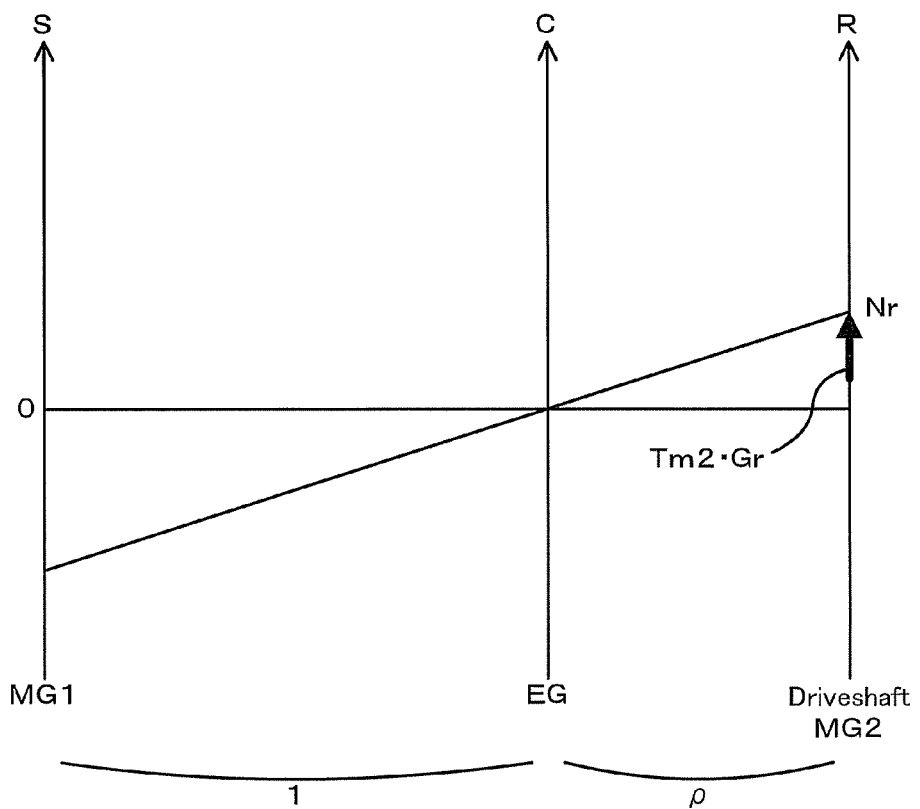
FIG. 13 is an alignment chart showing torque-rotation speed dynamics of respective rotational elements included in a power distribution integration mechanism 30 during motor travel with operation stop of an engine 22.

The CPU 72 subsequently determines whether the engine 22 is operated or the operation of the engine 22 is stopped (step S430). When the operation of the engine 22 is stopped, the CPU 72 determines whether the set driving power Pdrv* is less than or equal to the threshold value Pstart (step S440). When the driving power Pdrv* is less than or equal to the threshold value Pstart, it is decided that the motor travel should be continued and the CPU 72 sets a torque command Tm1* of the motor MG1 to value '0' (step S450). The CPU 72 sets a torque command Tm2* of the motor MG2 by dividing the torque demand Tr* by the gear ratio Gr of the reduction gear 35 (step S452), and sends the settings of the torque commands Tm1* and Tm2* to the motor ECU 40 (step S454). This routine is then terminated. In response to reception of the settings of the torque commands Tm1* and Tm2*, the motor ECU 40 performs switching control of the non-illustrated switching elements in the inverter 41 and the non-illustrated switching elements in the inverter 42 to drive the motor MG1 with the torque command Tm1* and the motor MG2 with the torque command Tm2*. This control enables the torque demand Tr* to be output from the motor MG2 to the ring gear shaft 32a or the drive shaft for driving the hybrid vehicle 20. FIG. 13 is an alignment chart showing torque-rotation speed dynamics of respective rotational elements included in the power distribution integration mechanism 30 during motor travel with operation stop of an engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35.

Upon determination that the driving power Pdrv* is more than the threshold value Pstart at the processing of step S440, the CPU 72 starts up the engine 22 (step S470). In a procedure for starting up the engine 22, the motor MG1 outputs some torque, the motor MG2 outputs torque for cancelling the torque output to the ring gear shaft 32a or the driveshaft according to the output torque from the motor MG1 to crank the engine 22, and various controls are started such as fuel injection control and ignition control when the rotation speed Ne of the engine 22 reaches a preset rotation speed (for example, 1000 rpm). During start-up of the engine 22, the drive control of the motor MG2 is performed as well to output the torque demand Tr* to the ring gear shaft 32a. The torque to be output from the motor MG2 thus becomes the sum of the torque to output the torque demand Tr* to the ring gear shaft 32a and the torque to cancel the applied torque to the ring gear shaft 32a by cranking the engine 22.

Figure 14:
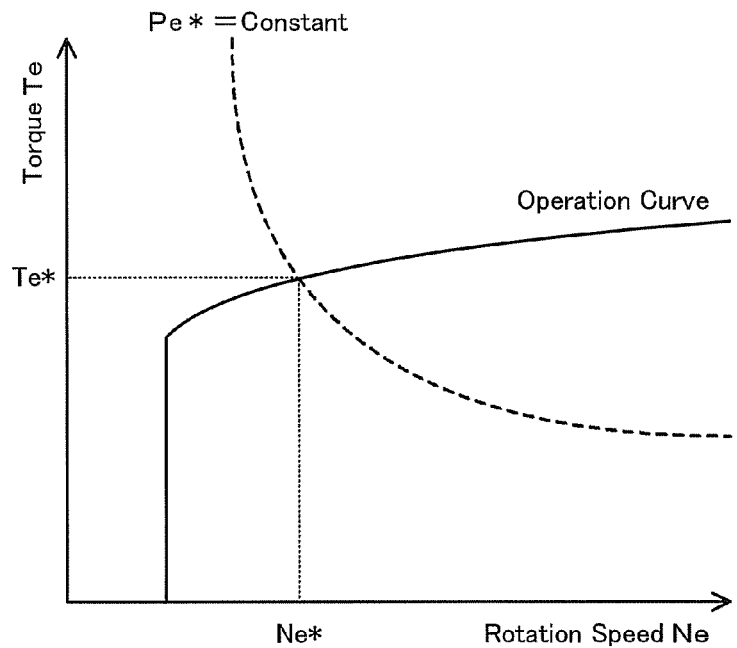
FIG. 14 shows an operation curve of the engine 22 used to set the target rotation speed Ne* and the target torque Te*.
Figure 15:
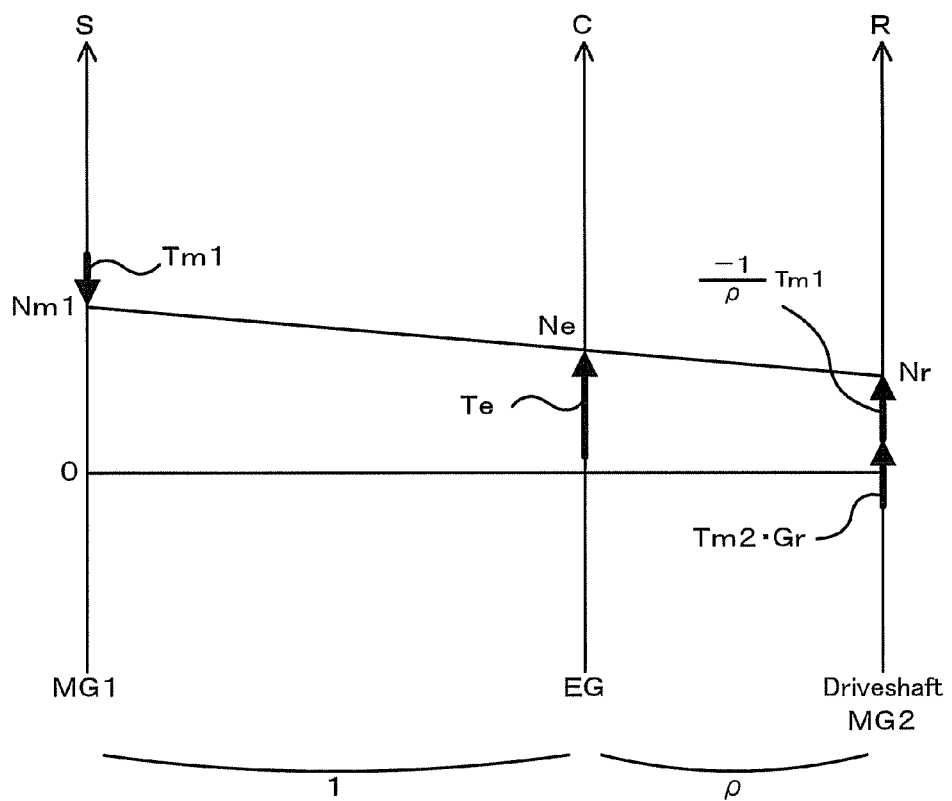
FIG. 15 is an alignment chart showing torque-rotation speed dynamics of the respective rotational elements included in the power distribution integration mechanism 30 during vehicle travelling with output power from the engine 22.

After starting up the engine 22, the CPU 72 sets the driving power Pdrv* to a power demand Pe* to be output from the engine 22 and sets a target rotation speed Ne* and a target torque Te* defining a target drive point of the engine 22 based on an operation curve of the engine 22 to ensure efficient operation of the engine 22 and the power demand Pe* (step S480). The CPU 72 calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (4) given below, while calculating a torque command Tm1* of the motor MG1 from the calculated target rotation speed Nm1* and the current rotation speed Nm1 of the motor MG1 according to Equation (5) given below (step S482). FIG. 14 shows an operation curve of the engine 22 used to set the target rotation speed Ne* and the target torque Te*. As clearly shown in the figure, the target rotation speed Ne* and the target torque Te* are given as an intersection of the operation curve and a curve of constant power demand Pe* (=Ne*×Te*). Equation (4) is a dynamic relational expression of respective rotational elements included in the power distribution integration mechanism 30. FIG. 15 is an alignment chart showing torque-rotation speed dynamics of the respective rotational elements included in the power distribution integration mechanism 30 during vehicle travelling with output power from the engine 22. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (4) is readily introduced from this alignment chart. Equation (5) is a relational expression of feedback control to drive and rotate the motor MG1 at the target rotation speed Nm1*. In Equation (5), 'k1' in the second term and 'k2' in the third term on the right side respectively denote a gain of the proportional and a gain of the integral term.

$$Nm1^* = Ne^* \cdot (1+\rho)/\rho - Nm2/\rho \quad (4)$$

$$Tm1^* = \rho \cdot Te^*/(1+\rho) + k1(Nm1^* - Nm1) + k2\int(Nm1^* - Nm1)dt \quad (5)$$

The CPU 72 then calculates a torque command Tm2* of the motor MG2 by adding the torque command Tm1* of the motor MG1 divided by the gear ratio ρ of the power distribution integration mechanism 30 to the torque demand Tr* according to Equation (6) given below (step S484). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S486), and this routine is terminated. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. This control enables the driving power Pdrv* to be output efficiently from the engine 22 to output the torque demand Tr* to the ring gear shaft 32a or the driveshaft for driving the hybrid vehicle 20. Equation (6) is readily introduced from the alignment chart of FIG. 15.

$$Tm2^* = (Tr^* + Tm1^*/\rho)/Gr \quad (6)$$

After driving start of the hybrid vehicle 20 with power from the engine 22, it is determined that the engine 22 is operated at the processing of step S430 when this routine is executed next time, and the CPU 72 compares the driving power Pdrv* with a value obtained by subtracting a preset power α as a margin from the threshold value Pstart (step S460). The preset power α is for having hysteresis to avoid frequent start and stop of the engine 22 while the driving power Pdrv* is near the threshold value Pstart and is predetermined to the extent appropriate. When the driving power Pdrv* is more than or equal to the value obtained by subtracting the preset power α from the threshold value Pstart, it is decided that the operation of the engine 22 should be continued. The CPU 72 sets the target rotation speed Ne* and the target torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* efficiently from the engine 22, and sends the settings to the engine ECU 24 and the motor ECU 40 (step S480 through S486). This routine is then terminated. When the driving power Pdrv* is less than the value obtained by subtracting the preset power α from the threshold value Pstart, the operation of the engine 22 is stopped (step S490). The CPU 72 sets the torque command Tm1* of the motor MG1 to value '0' to perform the motor travel and sets the torque command Tm2* to the torque demand Tr* devided by the gear ratio Gr of the reduction gear 35 and sends the settings of the torque commands Tm1* and Tm2* to the motor ECU 40 (steps S450 through S454). This routine is then terminated.

The motor travel prioritized catalyst warm-up time drive control routine of FIG. 10 is executed after the accumulated charge ratio SOC becomes less than the threshold value Scd and the engine 22 is started up in the state that the catalyst temperature Tc detected by the temperature sensor 134a located in the catalytic converter 134 is less than the threshold value Tref set as a lower limit temperature to activate the three-way catalyst. The engine 22 is operated in an appropriate operation state to the catalyst warm-up after start-up. As for the appropriate operation state to the catalyst warm-up, in this embodiment, the engine 22 performs self-sustaining operation at a preset rotation speed (for example, 1000 rpm or 1200 rpm) with delayed ignition timing of the engine 22.

Figure 16:
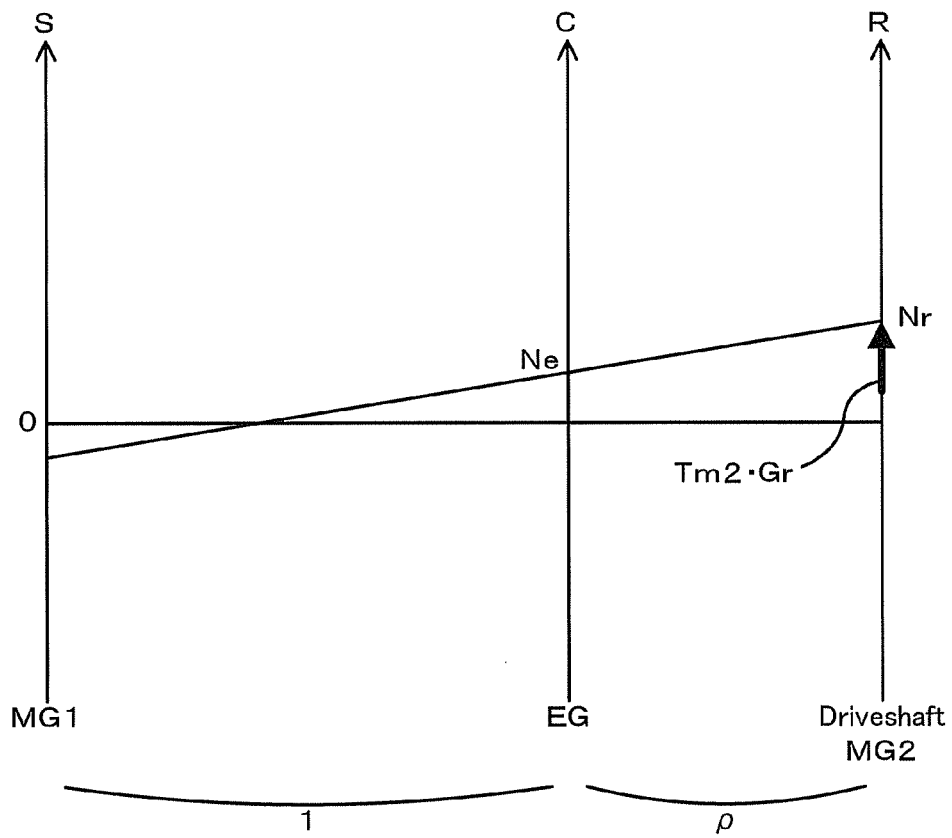
FIG. 16 is an alignment chart showing torque-rotation speed dynamics of the respective rotational elements included in the power distribution integration mechanism 30 during the motor travel in a state of catalyst warm-up.

In the motor travel prioritized catalyst warm-up time drive control routine of FIG. 10, the CPU 72 of the hybrid electronic control unit 70 inputs various data required for drive control as in the motor travel priority drive control routine, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC, and the input and output limits Win and Wout (step S500). The CPU 72 sets the torque demand Tr* using the torque demand setting map of FIG. 12 and sets the driving power Pdrv* as the sum of the product of the torque demand Tr* and the rotation speed Nr of the ring gear shaft 32a and the potential loss Loss (step S510). The CPU 72 obtains a value by multiplying the output limit Wout by the preset conversion factor kw and sets the value as the threshold value Pstart for starting up the engine 22 (step S520). The CPU 72 subsequently determines whether the hybrid vehicle 20 is driven with output power from the engine 22 or the engine 22 is operated in the appropriate state to the catalyst warm-up (step S530). When the engine 22 is operated in the appropriate state to the catalyst warm-up, the CPU 72 determines whether the driving power Pdrv* is less than or equal to the threshold value Pstart (step S540). When the driving power Pdrv* is less than or equal to the threshold value Pstart, it is decided that the motor travel should be continued with operation of the engine 22 in the appropriate state to the catalyst warm-up. The CPU 72 sets the torque command Tm1* to value '0' (step S550), and sets the torque command Tm2* of the motor MG2 by dividing the torque demand Tr* by the gear ratio Gr of the reduction gear 35 (step S552). The CPU 72 sends the settings of the torque commands Tm1* and Tm2* to the motor ECU 40 (step S554), and this routine is terminated. This control enables the torque demand Tr* to be output from the motor MG2 to the ring gear shaft 32a or the drive shaft for driving the hybrid vehicle 20 while the engine 22 is operated in the appropriate state to the catalyst warm-up. FIG. 16 is an alignment chart showing torque-rotation speed dynamics of the respective rotational elements included in the power distribution integration mechanism 30 during the motor travel with operation of the engine 22 in the appropriate state to the catalyst warm-up.

Upon determination that the driving power Pdrv* is more than the threshold value Pstart at the processing of step S540, the CPU 72 sets the driving power Pdrv* to the power demand Pe* and sets the target rotation speed Ne* and the target torque Te* of the engine 22 based on the operation curve (see FIG. 14) of the engine 22 to ensure efficient operation of the engine 22 and the power demand Pe* (step S580). The CPU 72 calculates the target rotation speed Nm1* of the motor MG1 according to Equation (4) given above, while calculating the torque command Tm1* of the motor MG1 according to Equation (5) (step 582). The CPU 72 calculates the torque command Tm2* of the motor MG2 according to Equation (6) (step S584), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S586). This routine is then terminated. This control enables the driving power Pdrv* to be output efficiently from the engine 22 to output the torque demand Tr* to the ring gear shaft 32a or the driveshaft for driving the hybrid vehicle 20.

After driving start of the hybrid vehicle 20 with power from the engine 22, it is determined that the hybrid vehicle 20 is driven with power from the engine 22 at the processing of step S530 when this routine is executed next time, and the CPU 72 compares the driving power Pdrv* with a value obtained by subtracting the preset power α as a margin from the threshold value Pstart (step S560). When the driving power Pdrv* is more than or equal to the value obtained by subtracting the preset power α from the threshold value Pstart, it is decided that the operation of the engine 22 should be continued. The CPU 72 sets the target rotation speed Ne* and the target torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* efficiently from the engine 22, and sends the settings to the engine ECU 24 and the motor ECU 40 (step S580 through S586). This routine is then terminated. When the driving power Pdrv* is less than the value obtained by subtracting the preset power α from the threshold value Pstart, the engine 22 is brought to be operated in the appropriate state to the catalyst warm-up (step S590). The CPU 72 sets the torque command Tm1* of the motor MG1 to value '0' to perform the motor travel with operation of the engine 22 in the appropriate state to the catalyst warm-up, sets the torque command Tm2* of the motor MG2 to the torque demand Tr* devided by the gear ratio Gr of the reduction gear 35, and sends the settings of the torque commands Tm1* and Tm2* to the motor ECU 40 (steps S550 through S554). This routine is then terminated.

In the motor travel prioritized catalyst warm-up time drive control routine as described above, the engine 22 is operated in the appropriate state to the catalyst warm-up or the engine 22 is operated to output power corresponding to the driving power Pdrv*, and the threshold value Pstart is not a threshold for starting up the engine 22 but a threshold value for outputting power corresponding to the driving power Pdrv*.

Figure 17:
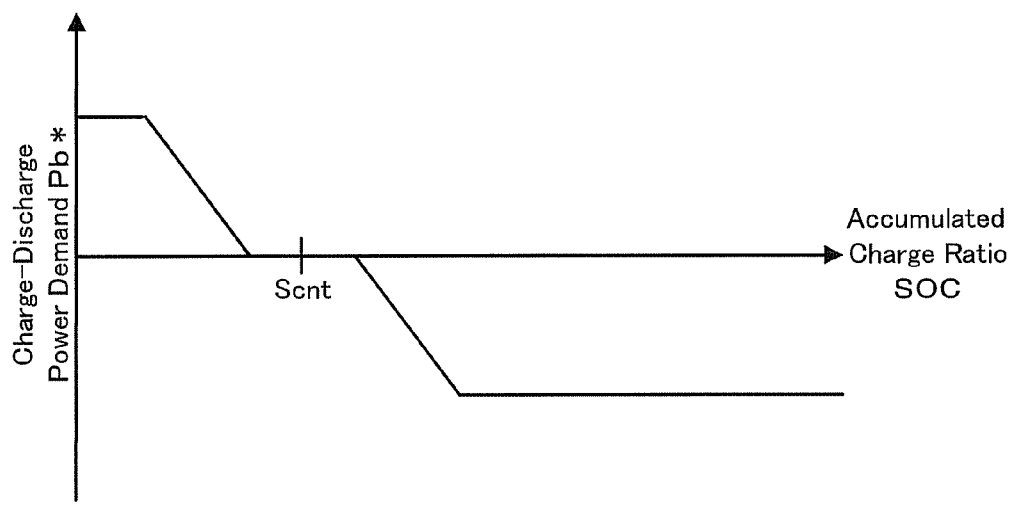
FIG. 17 shows one example of a charge-discharge power demand setting map.

The hybrid travel priority drive control routine of FIG. 11 is executed upon setting the hybrid travel priority mode as a travel mode. In this routine, the CPU 72 of the hybrid electronic control unit 70 inputs various data required for drive control, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC, the input and output limits Win and Wout, and a charge-discharge power demand Pb* (step S600). The CPU 72 sets the torque demand Tr* using the torque demand setting map of FIG. 12 and sets the driving power Pdrv* as the sum of the product of the torque demand Tr* and the rotation speed Nr of the ring gear shaft 32a and the potential loss Loss (step S610). A concrete procedure of setting the charge-discharge power demand Pb* in this embodiment provides and stores in advance variations in charge-discharge power demand Pb* against the accumulated charge ratio SOC as a charge-discharge power demand setting map and reads the charge-discharge power demand Pb* corresponding to the given accumulated charge ratio SOC from this charge-discharge power demand setting map. One example of the charge-discharge power demand setting map is shown in FIG. 17. In this embodiment as shown in the figure, a small dead band is prepared with a control center accumulated charge ratio Scnt as the center, and a charge-discharge power demand Pb* to discharge the master battery 50 is set against a larger accumulated charge ratio SOC than ratios in the dead band, while a charge-discharge power demand Pb* to charge the master battery 50 is set against a smaller accumulated charge ratio SOC than ratios in the dead band. The control center accumulated charge ratio Scnt may be set arbitrarily as the threshold value Shv to set the travel mode or a larger value than the threshold value Shv.

The CPU 72 subsequently sets the power demand Pe* to be output from the engine 22 as the sum of the driving power Pdrv* and the charge-discharge power demand Pb* (step S615), and sets a preset power Phv, which is predetermined as a little larger power than the minimum power enabling efficient operation of the engine 22, into the threshold value Pstart for starting up the engine 22 (step S620). The CPU 72 determines whether the engine 22 is operated or the operation of the engine 22 is stopped (step S630). When the operation of the engine 22 is stopped, the CPU 72 determines whether the power demand Pe* is less than or equal to the threshold value Pstart (step S640). When the power demand Pe* is less than or equal to the threshold value Pstart, it is decided that the motor travel should be performed and the CPU 72 sets the torque command Tm1* of the motor MG1 to value '0' (step S650), while setting the torque command Tm2* of the motor MG2 by dividing the torque demand Tr* by the gear ratio Gr of the reduction gear 35 (step S652). The CPU 72 then sends the settings of the torque commands Tm1* and Tm2* to the motor ECU 40 (step S654), and this routine is terminated. This control enables the torque demand Tr* to be output from the motor MG2 to the ring gear shaft 32a or the drive shaft for driving the hybrid vehicle 20.

Upon determination that the power demand Pe* is more than the threshold value Pstart at the processing of step S640, the CPU 72 starts up the engine 22 (step S670), and the CPU 72 sets the target rotation speed Ne* and the target torque Te* of the engine 22 based on the operation curve (see FIG. 14) of the engine 22 to ensure efficient operation of the engine 22 and the power demand Pe* (step S680). The CPU 72 calculates the target rotation speed Nm1* of the motor MG1 according to Equation (4) given above, while calculating the torque command Tm1* of the motor MG1 according to Equation (5) (step 682). The CPU 72 calculates the torque command Tm2* of the motor MG2 according to Equation (6) (step S684), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S686). This routine is then terminated. This control enables the driving power Pdrv* and the charge-discharge power demand Pb* for charge and discharge of the master battery 50 to be output efficiently from the engine 22 to output the torque demand Tr* to the ring gear shaft 32a or the driveshaft for driving the hybrid vehicle 20 with charge or discharge of the master battery 50.

After driving start of the hybrid vehicle 20 with power from the engine 22, it is determined that the engine 22 is operated at the processing of step S630 when this routine is executed next time, and the CPU 72 compares the power demand Pe* with a value obtained by subtracting a preset power γ as a margin from the threshold value Pstart (step S660). The preset power γ is, as with the preset power α described above, for having hysteresis to avoid frequent start and stop of the engine 22 while the power demand Pe* is near the threshold value Pstart. The preset power γ may be the same value as the preset power α or a different value from the preset power α. When the power demand Pe* is more than the value obtained by subtracting the preset power γ from the threshold value Pstart, it is decided that travelling with power from the engine 22 should be continued. The CPU 72 sets the target rotation speed Ne* and the target torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* and the charge-discharge power demand Pb* efficiently from the engine 22, and sends the settings to the engine ECU 24 and the motor ECU 40 (step S680 through S686). This routine is then terminated. When the power demand Pe* is less than the value obtained by subtracting the preset power γ from the threshold value Pstart, the operation of the engine 22 is stopped (step S690). The CPU 72 sets the torque command Tm1* of the motor MG1 to value '0' to perform the motor travel and sets the torque command Tm2* to the torque demand Tr* devided by the gear ratio Gr of the reduction gear 35 and sends the settings of the torque commands Tm1* and Tm2* to the motor ECU 40 (steps S650 through S654). This routine is then terminated.

In the hybrid vehicle 20 of the embodiment described above, when the accumulated charge ratio SOC at the system startup is more than or equal to the threshold value Sev, the motor travel priority mode where the hybrid vehicle 20 is driven to travel prioritizing the motor travel is set. During vehicle travelling with the motor travel priority mode, when the accumulated charge ratio SOC becomes less than the threshold value Scd that is smaller than the threshold value Sev and larger than the threshold value Shv for changing to the hybrid travel priority mode in the state that the catalyst temperature Tc from the temperature sensor 134a located in the catalytic converter 134 is less than the threshold value Tref as a lower limit temperature to activate the three-way catalyst, the engine 22 is started up to be operated in the appropriate state to warm-up of the three-way catalyst and the hybrid vehicle 20 continues to be driven with the motor travel priority mode. Accordingly, the engine 22 is not started up to warm up the three-way catalyst when the vehicle system is shut down before the accumulated charge ratio SOC becomes less than the threshold value Scd, and it is thus enabled to enhance fuel efficiency in comparison with a vehicle where the engine 22 is started up to warm up the three-way catalyst at the system startup. In addition, the timing when the engine 22 is started up to start warming up the three-way catalyst is a timing a little before the second connection state is changed to the slave shutoff state, that is, the timing when the output limit Wout decreases fast, and it is thus enabled to perform the motor travel sufficiently while warming up the three-way catalyst. As a result, it is enabled to improve exhaust emission after switching to the hybrid travel priority mode. With these effects, the engine 22 is effectively started up at a more appropriate timing to warm up the three-way catalyst.

In the hybrid vehicle 20 of the embodiment described above, upon setting the motor travel priority mode as the travel mode, the driving power Pdrv* is compared with the threshold value Pstart as a value (kw·Wout) obtained from multiplying the output limit Wout by the preset conversion factor kw, and the hybrid vehicle 20 performs the motor travel with operation stop of the engine 22 when the driving power Pdrv* is less than or equal to the threshold value Pstart, while the hybrid vehicle 20 is driven to travel with power from the engine 22 when the driving power Pdrv* is more than the threshold value Pstart. The accumulated charge ratio SOC is thus effectively decreased before the system shutdown. Accordingly, fuel efficiency and energy efficiency in the hybrid vehicle 20 is effectively enhanced. In addition, upon setting the hybrid travel priority mode as the travel mode, the power demand Pe* as the sum of the driving power Pdrv* and the charge-discharge power demand Pb* is compared with the threshold value Pstart as the preset power Phv which is predetermined as a little larger power than the minimum power enabling efficient operation of the engine 22, and the hybrid vehicle 20 performs the motor travel with operation stop of the engine 22 when the power demand Pe* is less than or equal to the threshold value Pstart, while the hybrid vehicle 20 is driven to travel with power from the engine 22 when the power demand Pe* is more than the threshold value Pstart. The hybrid vehicle 20 is thus efficiently driven.

In the hybrid vehicle 20 of the embodiment, during vehicle travelling with the motor travel priority mode, when the accumulated charge ratio SOC becomes less than the threshold value Scd, the engine 22 is started up and brought to the appropriate state to warm up the three-way catalyst and the hybrid vehicle 20 continues travelling with the motor travel priority mode. The threshold value Scd is set so that the accumulated charge ratio SOC reaches the threshold value Shv in the case that the hybrid vehicle 20 is driven with the maximum power in the motor travel for the predetermined time as the required time to warm up the three-way catalyst with the state that the catalyst temperature Tc is less than the threshold value Tref as the lower limit temperature to activate the three-way catalyst. This is not essential. The threshold value Scd may be set so that the accumulated charge ratio SOC reaches the threshold value Shv in the case that the hybrid vehicle 20 is driven with an average power for the predetermined time as the required time to warm up the three-way catalyst.

In the hybrid vehicle 20 of the embodiment, the master battery 50 and the slave batteries 60 and 62 are constructed as lithium-ion secondary batteries having the same rated capacity. This is not essential. They may be constructed as lithium-ion secondary batteries each having different rated capacity or different types of secondary batteries each having different rated capacity.

In the hybrid vehicle 20 of the embodiment, one master battery 50 and two slave batteries 60 and 62 are installed, but one master battery 50 and three or more slave batteries may be installed. In this case, when travelling with the motor travel priority mode, the master battery 50 may be connected to the side of the motors MG1 and MG2 and the three or more slave batteries may be sequentially connected to the side of the motors MG1 and MG2 as the connection state. In addition, one master battery and one slave battery may be installed, and two or more master batteries and two or more slave batteries may be installed. Only one single master battery 50 may also be installed.

In the hybrid vehicle 20 of the embodiment, one master battery 50 and two slave batteries 60 and 62 are installed, and the master battery 50 and the slave battery 60 are connected to the side of the motors MG1 and MG2 in the first connection state, while the master battery 50 and the slave battery 62 are connected to the side of the motors MG1 and MG2 in the second connection state, when travelling with the motor travel priority mode. Instead, the master battery 50 and the slave battery 62 may be connected to the side of the motors MG1 and MG2 in the first connection state, while the master battery 50 and the slave battery 60 are connected to the side of the motors MG1 and MG2 in the second connection state.

In the hybrid vehicle 20 of the embodiment, when travelling with the motor travel priority mode, switching between the motor travel and the vehicle travelling with power from the engine 22 is done by comparing the driving power Pdrv* with the threshold value Pstart obtained from multiplying the output limit Wout by the preset conversion factor kw. This is not essential. Switching between the motor travel and the vehicle travelling with power from the engine 22 may be done by comparing the driving power Pdrv* with a smaller threshold value than the threshold value Pstart obtained from multiplying output limit Wout by the preset conversion factor kw.

In the hybrid vehicle 20 of the embodiment, as the appropriate operation state of the engine 22 to the catalyst warm-up, the engine 22 performs self-sustaining operation at a preset rotation speed (for example, 1000 rpm or 1200 rpm) with delayed ignition timing of the engine 22. Instead, as the appropriate operation state of the engine 22 to the catalyst warm-up, the engine 22 may perform light load operation at a preset rotation speed with delayed ignition timing of the engine 22. In this case, electrical power balance may be calculated in consideration of a power obtained by the load operation of the engine 22.

In the hybrid vehicle 20 of the embodiment, the temperature sensor 134*a* that detects the temperature of the three-way catalyst in the catalytic converter 134 is located. This is not essential. Without locating this temperature sensor 134*a*, the catalyst temperature may be estimated, for example, from an integrated value of the intake air amount Qa. In this case, during vehicle travelling with the motor travel priority mode, when the accumulated charge ratio SOC becomes less than the threshold value Scd in the state that the estimated catalyst temperature is less than the threshold value Tref as a lower limit temperature to activate the three-way catalyst, the engine 22 may be started up to be operated in the appropriate state to warming up the three-way catalyst and the hybrid vehicle 20 may be driven with the motor travel priority mode.

Figure 18:
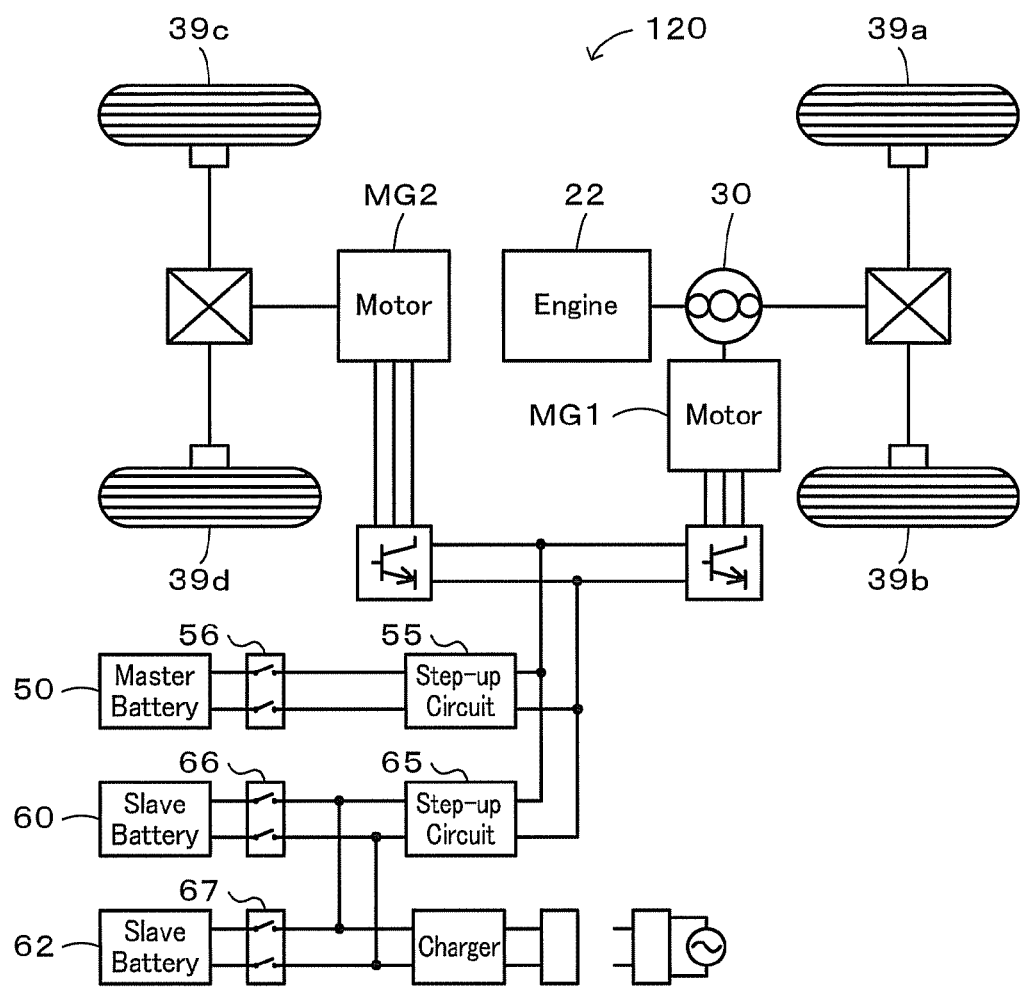
FIG. 18 schematically illustrates the configuration of another hybrid vehicle 120 in one modified example.

In the hybrid vehicle 20 of the embodiment, the power of the motor MG2 is converted by the reduction gear 35 and is output to the ring gear shaft 32*a*. The technique of the invention is also applicable to a hybrid vehicle 120 of a modified structure shown in FIG. 18. In the hybrid vehicle 120 of FIG. 18, the power of the motor MG2 is output to another axle (an axle linked with wheels 39*c* and 39*d*) that is different from the axle connecting with the ring gear shaft 32*a* (the axle linked with the drive wheels 39*a* and 39*b*).

Figure 19:
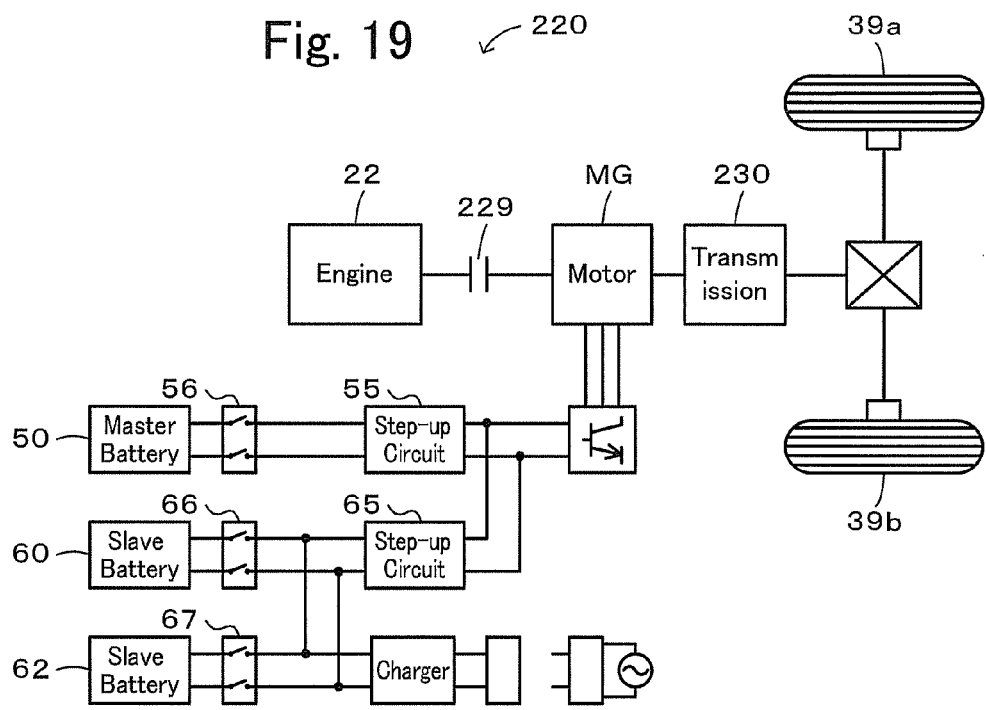
FIG. 19 schematically illustrates the configuration of still another hybrid vehicle 220 in another modified example.
Figure 20:
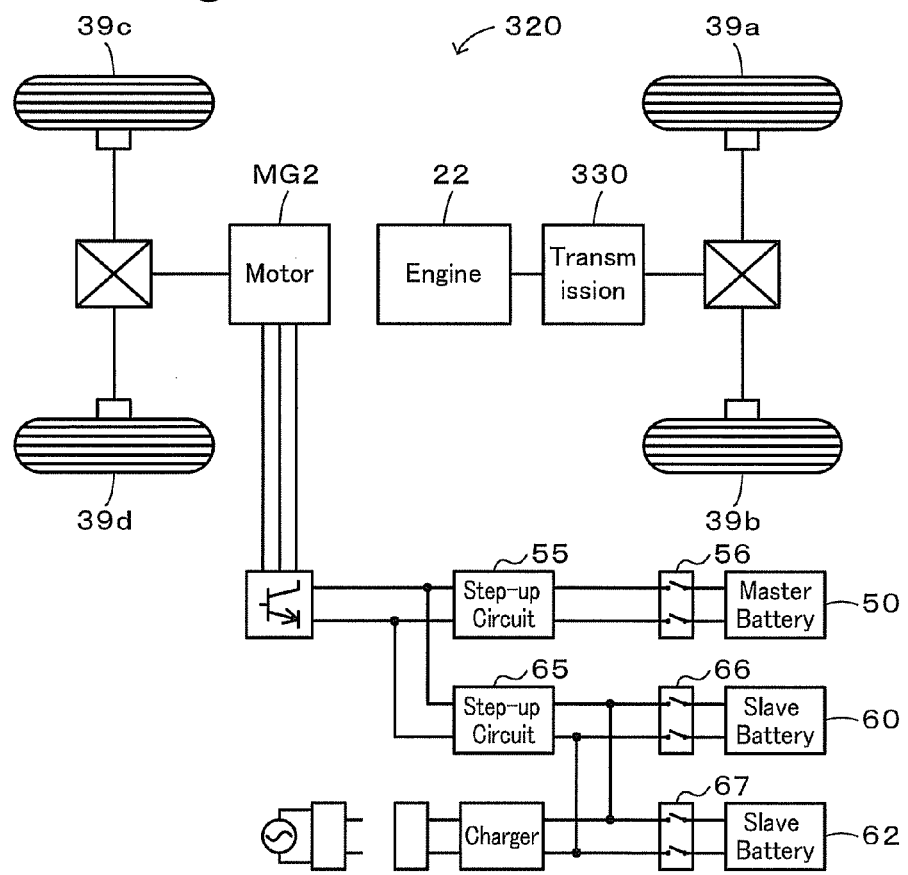
FIG. 20 schematically illustrates the configuration of another hybrid vehicle 320 in still another modified example.

In the hybrid vehicle 20 of the embodiment, the power from the engine 22 is output via the power distribution integration mechanism 30 to the ring gear shaft 32*a* or the driveshaft linked to the driving wheels 39*a* and 39*b*, and the power from the motor MG2 is output via the reduction gear 35 to the ring gear shaft 32*a* or the driveshaft. The technique of the invention is also applicable to a hybrid vehicle 220 of a modified structure shown in FIG. 19. In the hybrid vehicle 220 of FIG. 19, the motor MG is attached via a transmission 230 to a driveshaft linked to the driving wheels 39*a* and 39*b* and the engine 22 is connected via a clutch 229 to the rotating shaft of the motor MG. In this hybrid vehicle 220, the power from the engine 22 is output to the driveshaft via the rotating shaft of the motor MG and the transmission 230, and the power from the motor MG is output via the transmission 230 to the driveshaft. The technique of the invention is also applicable to a hybrid vehicle 320 of a modified structure shown in FIG. 20. In the hybrid vehicle 320 of FIG. 20, the power from the engine 22 is output via a transmission 330 to the axle linked with the driving wheels 39*a* and 39*b*, and the power from the motor MG is output to another axle (an axle linked with wheels 39*c* and 39*d* of FIG. 20) that is different from the axle linked with the driving wheels 39*a* and 39*b*. Namely, the technique of the invention is applicable to any type of hybrid vehicles having an engine that outputs power for driving the vehicle, a motor that outputs power for driving the vehicle, a battery that supplies electric power to the motor, and a charger that charges the battery at system shutdown.

In the above embodiment, the invention is described using an application to a hybrid vehicle. The invention may be applied to a control method of a hybrid vehicle.

The primary elements in the embodiment and its modified examples are mapped to the primary constituents in the claims of the invention as described below. The engine 22 equipped in the exhaust system with the catalytic converter 134 having the three-way catalyst in the embodiment corresponds to the 'internal combustion engine' in the claims of the invention. The motor MG2 in the embodiment corresponds to the 'motor' in the claims of the invention. The combination of the master battery 50, the slave batteries 60 and 62 each constructed as a lithium-ion secondary battery, and the system main relays 56, 66 and 67 in the embodiment corresponds to the 'battery unit' in the claims of the invention. The charger 90 in the embodiment corresponds to the 'charger' in the claims of the invention. The hybrid electronic control unit 70 executing the processing of step S410 in the motor drive priority drive control routine of FIG. 9, the processing of step S510 in the motor travel prioritized catalyst warm-up time drive control routine of FIG. 10, and the processing of step S610 in the hybrid travel priority drive control routine of FIG. 11 in the embodiment corresponds to the 'driving power setting module' in the claims of the invention. In the processing, the torque demand Tr* to be output to the ring gear shaft 32a or the driveshaft linked to the driving wheels 39a and 39b as a required torque for driving the vehicle is set based on the vehicle speed V and the accelerator opening Acc, and the driving power Pdrv* required for driving the vehicle is set as the sum of the product of the set torque demand Tr* and the rotation speed Nr of the ring gear shaft 32a and the potential loss Loss. The battery ECU 52 calculating the accumulated charge amount SOC1 of the master battery 50 and the accumulated charge amounts SOC2 and SOC3 of the slave batteries 60 and 62 from integrated values of the charge-discharge currents Ib1, Ib2 and Ib3 measured by the current sensors 51b, 61b and 63b, while calculating the accumulated charge ratio SOC as a ratio of the sum of these to the sum of the whole capacity rate in the embodiment corresponds to the 'accumulated charge ratio calculation module' in the claims of the invention. The hybrid electronic control unit 70 executing the travel mode setting routine of FIG. 5 to set the motor travel priority mode where the motor travel is prioritized for driving the vehicle until the accumulated charge ratio SOC reaches the threshold value Shv when the accumulated charge ratio SOC at system startup of the vehicle is more than or equal to the threshold value Sev, while setting the hybrid travel priority mode where the hybrid travel is prioritized for driving the vehicle both when the accumulated charge ratio SOC at the system startup is less than the threshold value Sev and when the accumulated charge ratio SOC reaches the threshold value Shv after the accumulated charge ratio SOC at the system startup is more than or equal to the threshold value Sev in the embodiment corresponds to the 'mode setting module' in the claims of the invention. The combination of the hybrid electronic control unit 70, the engine ECU 24, and the motor ECU 40 in the embodiment corresponds to the 'control module' in the claims of the invention. The hybrid electronic control unit 70 executes the processing of step S120 through S150 in the travel mode setting routine of FIG. 5, the connection state setting routine of FIG. 6, the step-up circuit control routine of FIG. 7, the motor travel priority drive control routine of FIG. 9, and the motor travel prioritized catalyst warm-up time drive control routine of FIG. 10, in order to control the engine 22 and the motors MG1 and MG2 so that the engine 22 is started up to be operated in the appropriate state to warm up the three-way catalyst and the hybrid vehicle 20 is driven to travel with the motor travel priority mode, when the accumulated charge ratio SOC becomes less than the threshold value Scd that is smaller than the threshold value Sev and larger than the threshold value Shv for shifting to the hybrid travel priority mode in the state that the catalyst temperature Tc is less than the threshold value Tref as a lower limit temperature to activate the three-way catalyst during the vehicle travelling with the motor travel priority mode. The engine ECU 24 executes receives control signals sent from the hybrid electronic control unit 70 to start up the engine 22, to stop the operation of the engine 22, to bring the engine 22 to the appropriate state to the warm-up of the three-way catalyst, and to control the engine 22 to be driven with the received target rotation speed Ne* and the target torque Te* sent from the hybrid electronic control unit 70. The motor ECU 40 controls the inverters 41 and 42 to drive the motors MG1 and MG2 with the received torque commands Tm1* and Tm2* sent from the hybrid electronic control unit 70.

The 'internal combustion engine' is not restricted to the engine 22 designed to consume a hydrocarbon fuel, such as gasoline or light oil, and thereby output power, but may be an internal combustion engine of any other design, for example, a hydrogen engine. The 'motor' is not restricted to the motor MG2 constructed as a synchronous motor generator but may be any type of motor constructed to input and output power to a driveshaft, for example, an induction motor. The 'battery unit' is not restricted to the combination of the master battery 50 and the slave batteries 60 and 62 each designed as a lithium-ion secondary battery and the system main relays 56, 66 and 67 but may be any other unit including at least one secondary battery designed to transmit electric power to and from the motor, for example, a combination having one master battery and three or more slave batteries, a combination having one master battery and one slave battery, a combination having two or more master batteries and two or more slave batteries, a unit having a single master battery, and a unit having secondary batteries other than lithium-ion batteries such as nickel metal hydride secondary batteries, nickel cadmium secondary batteries, and lead acid secondary batteries. The 'charger' is not restricted to the charger 90 including a charging relay, an AC-to-DC converter, and a DC-to-DC converter but may be any other charger that is connected to an external power supply in a system shutdown state of the hybrid vehicle to charge the secondary battery of the battery unit with electric power from the external power supply. The 'accumulated charge ratio calculation module' is not restricted to the arrangement of calculating the accumulated charge amount SOC1 of the master battery 50 and the accumulated charge amounts SOC2 and SOC3 of the slave batteries 60 and 62 from integrated values of the charge-discharge currents Ib1, Ib2 and Ib3 measured by the current sensors 51b, 61b and 63b, while calculating the accumulated charge ratio SOC as a ratio of the sum of these to the sum of the whole capacity rate, but may be any other arrangement of calculating an accumulated charge ratio that is a ratio of an accumulated charge amount in the at least one secondary battery of the battery unit to a whole capacity of the at least one secondary battery of the battery unit, for example, an arrangement of measuring the open-circuit voltages of the master battery 50 and the slave batteries 60 and 62 to calculate the accumulated charge amounts SOC1, SOC2 and SOC3 based on the measured open-circuit voltages, while calculating the accumulated charge ratio SOC as a ratio of the sum of these to the sum of the whole capacity rate. The 'mode setting module' is not restricted to the arrangement of setting the motor travel priority mode where the motor travel is prioritized for driving the vehicle until the accumulated charge ratio SOC reaches the threshold value Shv when the accumulated charge ratio SOC at system startup of the vehicle is more than or equal to the threshold value Sev, while setting the hybrid travel priority mode where the hybrid travel is prioritized for driving the vehicle both when the accumulated charge ratio SOC at the system startup is less than the threshold value Sev and when the accumulated charge ratio SOC reaches the threshold value Shv after the accumulated charge ratio SOC at the system startup is more than or equal to the threshold value Sev, but may be any other arrangement of, when the calculated accumulated charge ratio is at least larger than a first preset ratio at system startup of the hybrid vehicle, setting a motor travel priority mode where the motor travel is prioritized for driving the hybrid vehicle until the calculated accumulated charge ratio becomes less than a second preset ratio that is less than the first preset ratio during vehicle travelling, while setting a hybrid travel priority mode where the hybrid travel is prioritized for driving the hybrid vehicle when the motor travel priority mode is not set. The 'control module' is not restricted to the combination of the hybrid electronic control unit 70 with the engine ECU 24 and the motor ECU 40 but may be actualized by a single electronic control unit. The 'control module' is not restricted to the arrangement of controlling the engine 22 and the motors MG1 and MG2 so that the engine 22 is started up to be operated in the appropriate state to warm up the three-way catalyst and the hybrid vehicle 20 is driven to travel with the motor travel priority mode, when the accumulated charge ratio SOC becomes less than the threshold value Scd that is smaller than the threshold value Sev and larger than the threshold value Shv for shifting to the hybrid travel priority mode in the state that the catalyst temperature Tc is less than the threshold value Tref as a lower limit temperature to activate the three-way catalyst during the vehicle travelling with the motor travel priority mode, but may be any other arrangement of, when the calculated accumulated charge ratio becomes less than a third preset ratio that is smaller than the first preset ratio and larger than the second preset ratio in a state that the purifying catalyst is not at a temperature where the purifying catalyst is activated during vehicle travelling upon setting the motor travel priority mode to prioritize the motor travel, control the internal combustion engine and the motor so that the internal combustion engine is started up and the hybrid vehicle is driven with the motor travel priority mode while the internal combustion engine is operated in an appropriate state to warm up the purifying catalyst.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the hybrid vehicles.

The invention claimed is:

1. A hybrid vehicle, having an internal combustion engine capable of outputting power for driving the hybrid vehicle and equipped in an exhaust system with a catalytic conversion unit including a purifying catalyst for purifying exhaust, a motor constructed to input and output power for driving the hybrid vehicle, a battery unit including at least one secondary battery designed to transmit electric power to and from the motor, and a charger connected to an external power supply in a system shutdown state of the hybrid vehicle to charge the secondary battery of the battery unit with electric power from the external power supply, the hybrid vehicle being capable of:

motor travel when the hybrid vehicle is driven only with input and output power to and from the motor and hybrid travel when the hybrid vehicle is driven with output power from the internal combustion engine and with the input and output power to and from the motor, the hybrid vehicle comprising:

an accumulated charge ratio calculation module configured to calculate an accumulated charge ratio that is a ratio of an accumulated charge amount in the at least one secondary battery of the battery unit to a whole capacity of the at least one secondary battery of the battery unit;

a mode setting module configured to, when the calculated accumulated charge ratio is at least larger than a first preset ratio at system startup of the hybrid vehicle, set a motor travel priority mode where the motor travel is prioritized for driving the hybrid vehicle until the calculated accumulated charge ratio becomes less than a second preset ratio that is less than the first preset ratio during vehicle travelling, while setting a hybrid travel priority mode where the hybrid travel is prioritized for driving the hybrid vehicle when the motor travel priority mode is not set; and a control module configured to, when the calculated accumulated charge ratio becomes less than a third preset ratio that is smaller than the first preset ratio and larger than the second preset ratio in a state where the purifying catalyst is not at a temperature where the purifying catalyst is activated during vehicle travelling upon setting the motor travel priority mode to prioritize the motor travel, control the internal combustion engine and the motor so that the internal combustion engine is started up and the hybrid vehicle is driven with the motor travel priority mode while the internal combustion engine is operated in an appropriate state to warming up the purifying catalyst.

2. The hybrid vehicle in accordance with claim 1, wherein the third preset ratio is set so that the calculated accumulated charge ratio becomes the second preset ratio in a case that the hybrid vehicle is driven with the motor travel for a required time to warm up the purifying catalyst.

3. The hybrid vehicle in accordance with claim 2, wherein the third preset ratio is set so that the calculated accumulated charge ratio becomes the second preset ratio in a case that the hybrid vehicle is driven with a maximum power in the motor travel for a required time to warm up the purifying catalyst.

4. The hybrid vehicle in accordance with claim 1, wherein the battery unit including the at least one secondary battery has at least one main secondary battery, at least one auxiliary secondary battery, a main connect/disconnector that connects and disconnects the at least one main secondary battery to and from a side of the motor, an auxiliary connect/disconnector that connects and disconnects the at least one auxiliary secondary battery to and from the side of the motor, a main step-up-down circuit that transmits electric power with voltage regulation between a main battery voltage system connected to the at least one main secondary battery and a high voltage system at the side of the motor, and an auxiliary step-up-down circuit that transmits electric power with voltage regulation between an auxiliary battery voltage system connected to the at least one auxiliary secondary battery and the high voltage system at the side of the motor, and the control module is configured to, when the motor travel priority mode is set, control the main connect/disconnector and the main step-up-down circuit so that the at least one main secondary battery is connected to the side of the motor and power from the at least one main secondary battery is supplied to the motor and control the auxiliary connect/disconnector and the auxiliary step-up-down circuit so that the at least one auxiliary secondary battery is connected to the side of the motor and power from the at least one auxiliary secondary battery is supplied to the motor, while controlling the main connect/disconnector and the main step-up-down circuit so that a connection between the at least one main secondary battery and the side of the motor is maintained and a transmission between electric power of the at least one main secondary battery and electric power of the side of the motor is performed and control the auxiliary connect/disconnector so that all of the at least one auxiliary secondary battery is disconnected from the side of the motor when the calculated accumulated charge ratio becomes less than the second preset ratio during vehicle travelling with the motor travel priority mode and then the hybrid travel priority mode is set.

5. The hybrid vehicle in accordance with claim 4, wherein the battery unit including the at least one secondary battery has one secondary battery as the main secondary battery and two or more secondary batteries as the auxiliary secondary batteries, and the control module is configured to, when the motor travel priority mode is set, control the main connect/disconnector so that the main secondary battery is connected to the side of the motor and control the auxiliary connect/disconnector so that the auxiliary secondary batteries are sequentially switched and connected.

6. The hybrid vehicle in accordance with claim 1, the hybrid vehicle further comprising:

a driving power setting module configured to set a driving power required for driving the hybrid vehicle; and an output limit setting module configured to set an output limit of the battery unit as a maximum allowable electric power to be output from the secondary battery connected to the side of the motor out of the at least one secondary battery of the battery unit, wherein the control module is configured to, when the motor travel priority mode is set and the set driving power is less than or equal to a corresponding power to the set output limit of the battery unit, control the internal combustion engine and the motor so that the hybrid vehicle is driven with the motor travel, while controlling the internal combustion engine and the motor so that the hybrid vehicle is driven with the hybrid travel when the motor travel priority mode is set and the set driving power is more than the corresponding power to the set output limit of the battery unit.

7. The hybrid vehicle in accordance with claim 1, the hybrid vehicle further comprising:

a generator constructed to input and output power and transmit electric power to and from the secondary battery of the battery unit; and a planetary gear mechanism with three elements each connected to three shafts, an output shaft of the internal combustion engine, a rotating shaft of the generator, and a driveshaft linked to an axle of the hybrid vehicle, wherein the control module is configured to control the generator for operation control of the internal combustion engine.

8. A hybrid vehicle comprising:

an internal combustion engine;

an engine electronic control unit;

an exhaust system with a catalytic conversion unit for purifying exhaust of the engine;

a motor;

a battery unit designed to transmit electric power to and from the motor, wherein the hybrid vehicle is capable of motor travel where the hybrid vehicle is driven only with the motor and hybrid travel where the hybrid vehicle is driven with the internal combustion engine and with the motor;

an accumulated charge ratio calculation module configured to calculate an SOC ratio of the battery unit;

a motor travel priority mode which prioritizes the motor travel;

a hybrid travel priority mode which prioritizes the hybrid travel; and a mode setting module which sets the motor travel priority mode when the SOC ratio is larger than a first preset value and the hybrid motor travel priority mode when the SOC ratio is less than a second preset value that is less than the first preset value;

wherein the engine electronic control unit starts up the engine and warms-up the catalytic conversion unit when the SOC ratio becomes less than a third preset ratio that is smaller than the first preset ratio and larger than the second preset ratio while maintaining the motor travel priority mode.

* * * * *